US007102496B1

(12) United States Patent
Ernst, Jr. et al.

(10) Patent No.: US 7,102,496 B1
(45) Date of Patent: Sep. 5, 2006

(54) MULTI-SENSOR INTEGRATION FOR A VEHICLE

(75) Inventors: Raymond P. Ernst, Jr., Canton, MI (US); Terry B. Wilson, Chandler, AZ (US)

(73) Assignee: Yazaki North America, Inc., Canton, MI (US)

( * ) Notice: Subject to any disclaimer, the term of this patent is extended or adjusted under 35 U.S.C. 154(b) by 399 days.

(21) Appl. No.: 10/208,280

(22) Filed: Jul. 30, 2002

(51) Int. Cl.
*B60Q 1/00* (2006.01)

(52) U.S. Cl. ...................... 340/436; 340/438; 340/903; 180/167

(58) Field of Classification Search ................ 340/436, 340/435, 438, 439, 425.5, 903, 905, 521, 340/928; 180/167, 169; 367/903; 307/9.1, 307/10.1
See application file for complete search history.

(56) References Cited

U.S. PATENT DOCUMENTS 5,357,438 A * 10/1994 Davidian ..................... 701/301
5,465,079 A * 11/1995 Bouchard et al. ........... 340/576
5,999,092 A * 12/1999 Smith et al. ................ 340/436
6,215,415 B1 * 4/2001 Schroder ................. 340/932.2
6,222,447 B1 * 4/2001 Schofield et al. ........... 340/461
6,443,400 B1 * 9/2002 Murata et al. .............. 246/1 R
6,615,137 B1 * 9/2003 Lutter et al. ................ 701/301
6,624,747 B1 * 9/2003 Friederich et al. .......... 340/436
6,662,099 B1 * 12/2003 Knaian et al. .............. 701/117
6,670,910 B1 * 12/2003 Delcheccolo et al. ......... 342/70
6,765,495 B1 * 7/2004 Dunning et al. ............ 340/903
6,784,828 B1 * 8/2004 Delcheccolo et al. ......... 342/70

* cited by examiner

*Primary Examiner*—Phung T. Nguyen
(74) *Attorney, Agent, or Firm*—Rader, Fishman & Grauer PLLC

(57) ABSTRACT

A sensor system for use in a vehicle that integrates sensor data from more than one sensor in an effort to facilitate collision avoidance and other types of sensor-related processing. The system include external sensors for capturing sensor data external to the vehicle. External sensors can include sensors of a wide variety of different sensor types, including radar, image processing, ultrasonic, infrared, and other sensor types. Each external sensor can be configured to focus on a particular sensor zone external to the vehicle. Each external sensor can also be configured to focus primarily on particular types of potential obstacles and obstructions based on the particular characteristics of the sensor zone and sensor type. All sensor data can be integrated in a comprehensive manner by a threat assessment subsystem within the sensor system. The system is not limited to sensor data from external sensors. Internal sensors can be used to capture internal sensor data, such a vehicle characteristics, user attributes, and other types of interior information. Moreover, the sensor system can also include an information sharing subsystem of exchanging information with other vehicle sensor systems or for exchanging information with non-vehicle systems such as a non-movable highway sensor system configured to transmit and receive information relating to traffic, weather, construction, and other conditions. The sensor system can potentially integrate data from all different sources in a comprehensive and integrated manner. The system can integrate information by assigning particular weights to particular determinations by particular sensors.

46 Claims, 14 Drawing Sheets

MULTI-SENSOR INTEGRATION FOR A VEHICLE

BACKGROUND OF THE INVENTION

This invention relates generally to sensor systems used in vehicles to facilitate collision avoidance, capture environmental information, customize vehicle functions to the particular user, exchange information with other vehicles and infrastructure sensors, and/or perform other functions. More specifically, the invention relates to vehicle sensor systems that integrate data from multiple sensors, with different sensors focusing on different types of inputs.

People are more mobile than ever before. The number of cars, trucks, buses, recreational vehicles, and sport utility vehicles (collectively "automobiles") on the road appears to increase with each passing day. Moreover, the ongoing transportation explosion is not limited to automobiles. A wide variety of different vehicles such as automobiles, motorcycles, planes, trains, boats, forklifts, golf carts, mobile industrial and construction equipment, and other transportation devices (collectively "vehicles") are used to move people and cargo from place to place. While there are many advantages to our increasingly mobile society, there are also costs associated with the explosion in the number and variety of vehicles. Accidents are one example of such a cost. It would be desirable to reduce the number of accidents and/or severity of such accidents through the use of automated systems configured to identify potential hazards so that potential collisions could be avoided or mitigated. However, vehicle sensor systems in the existing art suffer from several material limitations.

Different types of sensors are good at detecting different types of situations. For example, radar is effective at long distances, and is good at detecting speed and range information. However, radar may not be a desirable means for recognizing a small to medium sized obstruction in the lane of an expressway. In contrast, image processing sensors excel in identifying smaller obstructions closer to the vehicle, but are not as successful in obtaining motion data from a longer range. Ultrasonic sensors are highly environmental resistant and inexpensive, but are only effective at extremely short distances. There are numerous other examples of the relative advantages and disadvantages of particular sensor types. Instead of trying to work against the inherent attributes of different sensor types, it would be desirable for a vehicle sensor system to integrate the strengths of various different types in a comprehensive manner. It would also be desirable if a vehicle sensor system were to weigh sensor data based on the relative strengths and weaknesses of the type of sensor. The utility of an integrated multi-sensor system of a vehicle can be greater than the sum of its parts.

The prior art includes additional undesirable limitations. Existing vehicle sensor systems that capture information external to the vehicle ("external sensor data") tend to ignore important data sources within the vehicle ("internal sensor data"), especially information relating to the driver or user (collectively "user"). However, user-based attributes are important in assessing potential hazards to a vehicle. The diversity of human users presents many difficulties to the one-size-fits-all collision avoidance systems and other prior art systems. Every user of a vehicle is unique in one or more respects. People have different: braking preferences, reaction times, levels of alertness, levels of experience with the particular vehicle, vehicle use histories, risk tolerances, and a litany of other distinguishing attributes ("user-based attributes"). Thus, it would be desirable for a vehicle sensor system to incorporate internal sensors data that includes user-related information and other internal sensor data in assessing external sensor data.

In the same way that prior art sensors within a particular vehicle tend to be isolated from each other, prior art vehicle sensors also fail to share information with other sources in a comprehensive and integrated manner. It would be desirable if vehicle sensor systems were configured to share information with the vehicle sensor systems of other vehicles ("foreign vehicles" and "foreign vehicle sensor systems"). It would also be desirable if vehicle sensor systems were configured to share information with other types of devices external to a vehicle ("external sensor system") such as infrastructure sensors located along an expressway. For example, highways could be equipped with sensor systems relating to weather, traffic, and other conditions informing vehicles of obstructions while the users of those vehicles have time to take an alternative route.

Traditional vehicle sensors are isolated from each other because vehicles do not customarily include an information technology network to which sensors can be added or removed in a "plug and play" fashion. It would be desirable for vehicles utilizing a multi-sensor system to support all sensors and other devices using a single network architecture or a single interface for various applications. It would be desirable for such a architecture to include an object-oriented interface, so that programmers and developers can develop applications for the object-oriented interface, without cognizance of the underlying network operating system and architecture. It would be desirable for such an interface to be managed by a sensor management object responsible for integrating all sensor data.

SUMMARY OF INVENTION

The invention is a vehicle sensor system that integrates sensor information from two or more sensors. The vehicle sensor system can utilize a wide variety of different sensor types. Radar, video imaging, ultrasound, infrared, and other types of sensors can be incorporated into the system. Sensors can target particular areas ("sensor zones") and particular potential obstructions ("object classifications"). The system preferably integrates such information in a weighted-manner, incorporating confidence values for all sensor measurements.

In addition to external vehicle sensors, the system can incorporate sensors that look internal to the vehicle ("internal sensors"), such as sensors used to obtain information relating to the user of the vehicle ("user-based sensors") and information relating to the vehicle itself ("vehicle-based sensors"). In a preferred embodiment of the invention, the vehicle sensor system can transmit and receive information from vehicle sensor systems in other vehicles ("foreign vehicles"), and even with non-vehicular sensor systems that monitor traffic, environment, and other attributes potentially relevant to the user of the vehicle.

The vehicle sensor system can be used to support a wide range of vehicle functions, including but not limited to adaptive cruise control, autonomous driving, collision avoidance, collision warnings, night vision, lane tracking, lateral vehicle control, traffic monitoring, road surface condition, lane change/merge detection, rear impact collision warning/avoiding, backup aids, backing up collision warning/avoidance, and pre-crash airbag analysis. Vehicles can be configured to analyze sensor data in a wide variety of different ways. The results of that analysis can be used to provide vehicle users with information. Vehicles can also be configured to respond automatically, without human intervention, to the results of sensor analysis.

The foregoing and other advantages and features of the invention will be more apparent from the following description when taken in connection with the accompanying drawings.

DETAILED DESCRIPTION OF A PREFERRED EMBODIMENT

I. Introduction and Environmental View

Figure 1:
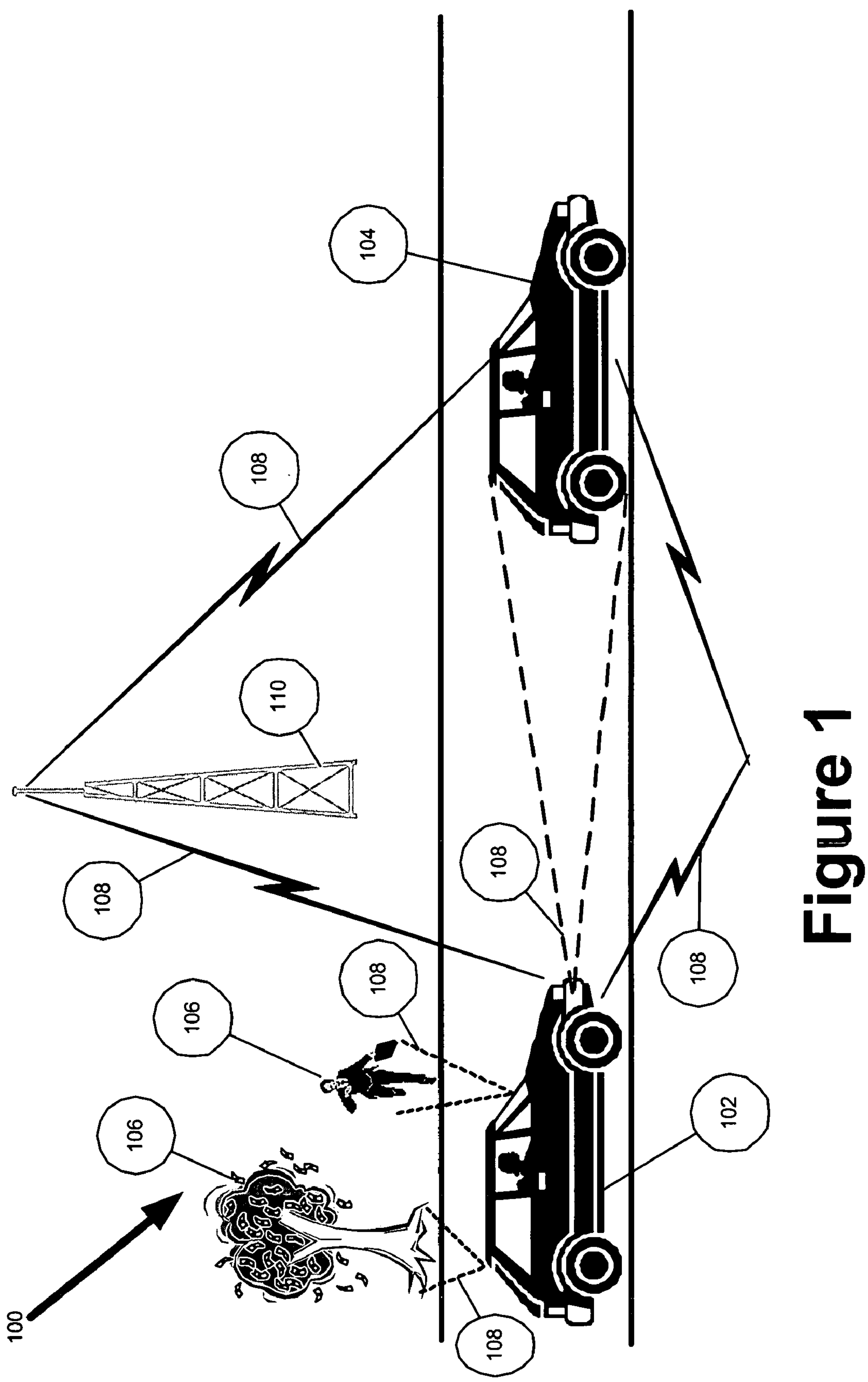
FIG. 1 is an illustration of one example of an environmental view of the invention.

FIG. 1 illustrates one example of an embodiment of a vehicle sensor system 100. The system 100 can be incorporated into any computational device capable of running a computer program. The underlying logic implemented by the system 100 can be incorporated into the computation device in the form of software, hardware, or a combination of software and hardware. Regardless of how the system 100 is physically configured, the system 100 can create a comprehensive and integrated sensor envelope utilizing a variety of sensing technologies that will identify, classify, and track all objects within predefined "threat zones" around a vehicle 102 housing the system 100. The system 100 can incorporate a wide range of different sensor technologies ("sensor types"), including but not limited to radar, sonar, image processing, ultra sonic, infrared, and any other sensor either currently existing or developed in the future. In a preferred embodiment of the system 100, new sensors can be added in a "plug and play" fashion. In some preferred embodiments, this flexibility is supported by an object-oriented interface layer managed by a sensor management object. The computation device in such embodiments is preferably a computer network, with the various sensors of the system 100 interacting with each other through a sensor management object and an object interface layer that renders proprietary network protocols transparent to the sensors and the computer programmers implementing the system 100.

The system 100 is used from the perspective of the vehicle 102 housing the computation device that houses the system 100. The vehicle 102 hosting the system 100 can be referred to as the "host vehicle," the "source vehicle," or the "subject vehicle." In a preferred embodiment of the invention, the vehicle 102 is an automobile such as a car or truck. However, the system 100 can be used by a wide variety of different vehicles 102 including boats, submarines, planes, gliders, trains, motorcycles, bicycles, golf carts, scooters, robots, forklifts (and other types of mobile industrial equipment), and potentially any mobile transportation device (collectively "vehicle").

The sensor system 100 serves as the eyes and ears for the vehicle. In a preferred embodiment of the system 100, information can come from one of three different categories of sources: external sensors, internal sensors, and information sharing sensors.

A. External Sensors

The system 100 for a particular host vehicle 102 uses one or more external sensors to identify, classify, and track potential hazards around the host vehicle 102, such as another vehicle 104 (a "target vehicle" 104 or a "foreign vehicle" 104). The system 100 can also be configured and used to capture sensor data 108 relating to external non-vehicle foreign objects ("target object" 106 or "foreign object" 106) that could pose a potential threat to the host vehicle 102. A pedestrian 106 crossing the street without looking is one example of such a potential hazard. A large object such as a tree 106 at the side of the road is another example of a potential hazard. The different types of potential objects that can be tracked are nearly limitless, and the system 100 can incorporate as many predefined object type classifications as are desired for the particular embodiment. Both stationary and moving objects should be tracked because the vehicle 102 itself is moving, so non-moving objects can constitute potential hazards.

In a preferred embodiment, different sensor types are used in combination with each other by the system 100. Each sensor type has its individual strengths and weaknesses with regards to sensing performance and the usability of the resulting data. For example, image processing is well suited for identifying and classifying objects such as lane lines on a road, but relatively weak at determining range and speed. In contrast, radar is well suited for determining range and speed, but is not well suited at identifying and classifying objects in the lane. The system 100 should be configured to take advantage of the strengths of various sensor types without being burdened by the weaknesses of any single "stand alone" sensor. For example, imaging sensors can be used to identify and classify objects, and radar can be used to track the number of objects, the range of the objects, the relative position and velocity of the objects, and other position/motion attributes. External sensors and external sensor data are described in greater detail below.

B. Internal Sensors

The effort to maximize sensor inputs is preferably not limited to information outside the vehicle 102. In a preferred embodiment, internal data relating to the vehicle 102 itself and a user of the vehicle 102 are also incorporated into the processing of the system 100. Internal sensor data is useful for a variety of reasons. External sensors tend to capture information relative to the movement of the target object 108 and the sensor itself, which is located on a moving vehicle 102. Different vehicles have different performance capabilities, such as the ability to maneuver, the ability to slow down, the ability to brake, etc. Thus, different vehicles may react to identical obstacles in different ways. Thus, information relating to the movement of the vehicle 102 itself can be very helpful in identifying potential hazards. Internal sensor data is not limited to vehicle-based attributes. Just as different vehicles types behave differently, so do different drivers. Moreover, the same driver can be at various states of alertness, experience, etc. In determining when it makes sense for a collision warning to be triggered or for mitigating action to be automatically initiated without human intervention, it is desirable to incorporate user-based attributes into the analysis of any such feedback processing. Internal sensors and internal sensor data are described in greater detail below.

C. Information Sharing

In a preferred embodiment of the system 100, more information is generally better than less information. Thus, it can be desirable to configure the system 100 to exchange information with other sources. Such sources can include the systems on a foreign vehicle 104 or a non-vehicular sensor system 110. In a preferred automotive embodiment of the system 100, infrastructure sensors 110 are located along public roads and highways to facilitate information sharing with vehicles. Similarly, a preferred automotive embodiment includes the ability of vehicles to share information with each other. Information sharing can be on several levels at once:

(a) within the vehicle between active subsystems;

(b) between the vehicle and other "foreign" vehicle systems;

(c) between the vehicle and external environment and infrastructure such as electronic beacons, signs, etc.; and (d) between the vehicle and external information sources such as cell networks, the internet, dedicated short range communication transmitters, etc.

Information sharing is described in greater detail below.

D. Feedback Processing

In a preferred embodiment, the system 100 does not capture and analyze sensor data 108 as an academic exercise. Rather, data is captured to facilitate subsequent actions by the user of the host vehicle 102 or by the host vehicle 102 itself. Feedback generated using the sensor data of the system 100 typically takes one or more of the following forms: (1) a visual, audio, and/or haptic warning to the user, which ultimately relies on the user to take corrective action; and/or (2) a change in the behavior of the vehicle itself, such as a decrease in speed. The various responses that the system 100 can invoke as the result of a potential threat are discussed in greater detail below.

II. Subsystem View

Figure 2:
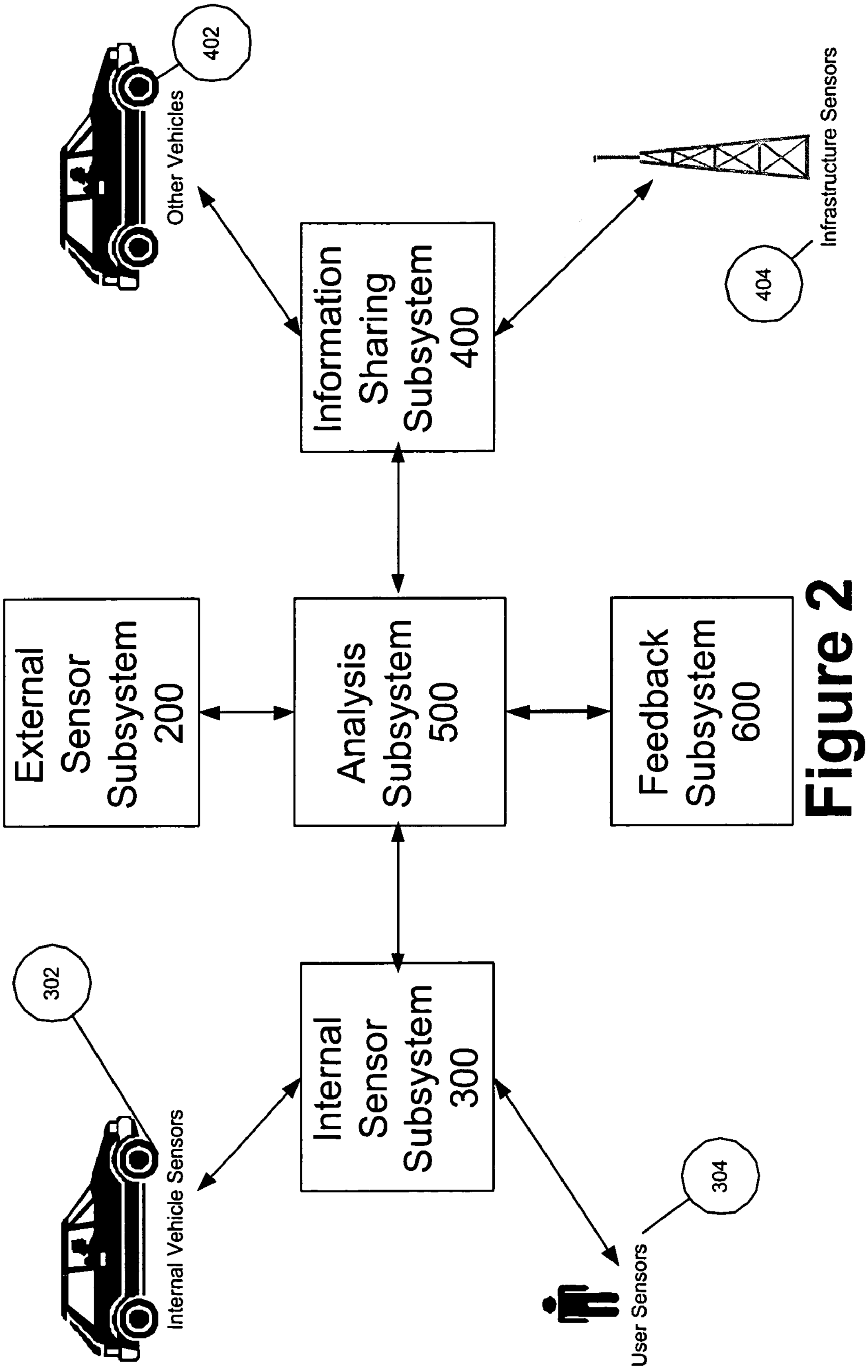
FIG. 2 is an illustration of one example of a subsystem-level view of the invention.

FIG. 2 illustrates a subsystem view of the system 100. The system 100 can be divided up into various input subsystems, an analysis subsystem 500 a feedback subsystem 600. Different embodiments can utilize a different number of input subsystems. In a preferred embodiment, there are at least three input subsystems, an external sensor subsystem 200, an internal sensor subsystem 300, and an information sharing subsystem 400.

A. External Sensor Subsystem

The external sensor subsystem 200 is for the capturing of sensor data 108 relating to objects and conditions outside of the vehicle. In a preferred embodiment, the external sensor subsystem 200 includes more than one sensor, more than one sensor type, and more than one sensor zone. Each sensor in the external sensor subsystem 200 should be configured to capture sensor data from a particular sensor zone with regards to the host vehicle 102. In some embodiments, no two sensors in the external sensor subsystem 200 are of the same sensor type. In some embodiments, no two sensors in the external sensor subsystem 200 capture sensor data from the same sensor zone. The particular selections of sensor types and sensor zones should be made in the context of the desired feedback functionality. In other words, the desired feedback should determine which sensor or combination of sensors should be used.

B. Internal Sensor Subsystem

The internal sensor subsystem 300 is for the capturing of sensor data 108 relating to the host vehicle 102 itself, and persons and/or objects within the host vehicle 102, such as the user of the vehicle 102. An internal vehicle sensor 302 can be used to measure velocity, acceleration, vehicle performance capabilities, vehicle maintenance, vehicle status, and any other attribute relating to the vehicle 102.

A user sensor 304 can be used to capture information relating to the user. Some user-based attributes can be referred to as selection-based attributes because they relate directly to user choices and decisions. An example of a selection-based attribute is the desired threat sensitivity for warnings. Other user-based attributes can be referred to as history-based attributes because they relate to the historical information relating to the user's use of the vehicle 102, and potentially other vehicles. For example, a user's past breaking history could be used to create a breaking profile indicating the breaking level at which a particular user feels comfortable using. Still other user-based attributes relate to the condition of the user, and can thus be referred to as condition-based attributes. An example of a condition-based attribute is alertness, which can be measured in terms of movement, heart rate, or responsiveness to oral questions. In order to identify the user of the host vehicle 102, the system 100 can utilize a wide variety of different identification technologies, including but not limited to voice prints, finger prints, retina scans, passwords, smart cards with pin numbers, etc.

In a preferred embodiment, both vehicle-based attributes and user-based attributes are used.

C. Information Sharing

The information sharing subsystem 400 provides a mechanism for the host vehicle 102 to receive potentially useful information from outside the host vehicle 102, as well to send information to sensor systems outside the host vehicle 102. In a preferred embodiment, there are at least two potential sources for information sharing. The host vehicle 102 can share information with a foreign vehicle 402. Since internal sensors relating to velocity and other attributes, it can be desirable for the vehicles to share with each other velocity, acceleration, and other position and motion-related information.

Information sharing can also take place through non-vehicular sensors, such as a non-moving infrastructure sensor 404. In a preferred automotive embodiment, infrastructure sensors 404 are located along public roads and highways.

D. Analysis Subsystem

The system 100 can use an analysis subsystem 500 to then integrate the sensor data 108 collected from the various input subsystems. The analysis subsystem 500 can also be referred to as a threat assessment subsystem 500, because the analysis subsystem 500 can perform the threat assessment function. However, the analysis subsystem 500 can also perform functions unrelated to threat assessments, such as determining better navigation routes, suggesting preferred speeds, and other functions that incorporate environmental and traffic conditions without the existence of a potential threat.

In determining whether a threat exists, the analysis subsystem 500 takes the sensor data 108 of the various input subsystems in order to generate a threat assessment. In most embodiments, the sensor data 108 relates to position and/or motion attributes relating to the target object 106 or target vehicle 104 captured by the external sensor subsystem 200, such as position, velocity, or acceleration. In a preferred embodiment of the invention, the threat assessment subsystem 500 also incorporates sensor data from the internal sensor subsystem 300 and/or the information sharing subsystem 400. internal attribute in determining the threat assessment. An internal attribute is potentially any attribute relating to the internal environment of the vehicle 102. If there is overlap with respect to the sensor zones covered by particular sensors, the system 100 can incorporate predetermined weights in which to determine which sensor measurements are likely more accurate in the particular predetermined context.

The analysis subsystem 500 should be configured to incorporate and integrate all sensor data 108 from the various input subsystems. Thus, if a particular embodiment includes an internal vehicle sensor 302, data from that sensor should be included in the resulting analysis. The types of data that can be incorporated into an integrated analysis by the analysis subsystem 500 is described in greater detail below.

The analysis subsystem 500 can evaluate sensor data in many different ways. Characteristics relating to the roadway environment ("roadway environment attribute") can be used by the threat assessment subsystem 500. Roadway environment attributes can include all relevant aspects of roadway geometry including on-road and off-road features. Roadway environment attributes can include such factors as change in grade, curves, intersections, road surface conditions, special roadways (parking lots, driveways, alleys, off-road, etc.), straight roadways, surface type, and travel lanes.

The analysis subsystem 500 can also take into account atmospheric environment attributes, such as ambient light, dirt, dust, fog, ice, rain, road spray, smog, smoke, snow, and other conditions. In a preferred embodiment of the system 100, it is more important that the system 100 not report atmospheric conditions as false alarms to the user than it is for the system 100 to function in all adverse environmental conditions to the maximum extent. However, the system 100 can be configured to detect atmospheric conditions and adjust operating parameters used to evaluate potential threats.

By putting assigning a predetermined context to a particular situation, the analysis subsystem 500 can make better sense of the resulting sensor data. For example, if a vehicle 102 is in a predefined mode known as "parking," the sensors employed by the system 100 can focus on issues relating to parking. Similarly, if a vehicle 102 is in a predefined mode known as "expressway driving," the sensors of the system 100 can focus on the most likely threats.

The traffic environment of the vehicle 102 can also be used by the analysis subsystem 500. Occurrences such as lane changes, merging traffic, cut-in, the level of traffic, the nature of on-coming traffic ("head-on traffic"), the appearance of suddenly exposed lead vehicles due to evasive movement by a vehicle, and other factors can be incorporated into the logic of the decision of whether or not the system 100 detects a threat worthy of a response.

A wide variety of different threat assessment heuristics can be utilized by the system 100 to generate threat assessments. Thus, the analysis subsystem 500 can generate a wide variety of different threat assessments. Such threat assessments are then processed by the feedback subsystem 600. Different embodiments of the system 100 may use certain heuristics as part of the threat assessment subsystem 300 where other embodiments of the system 100 use those same or similar heuristics as part of the feedback subsystem 400.

E. Feedback Subsystem

The feedback subsystem 600 is the means by which the system 100 responds to a threat detected by the threat assessment subsystem 500. Just as the threat assessment subsystem 500 can incorporate sensor data from the various input subsystems, the feedback subsystem 600 can incorporate those same attributes in determining what type of feedback, if any, needs to be generated by the system 100.

The feedback subsystem 400 can provide feedback to the user and/or to the vehicle itself. Some types of feedback ("user-based feedback") rely exclusively on the user to act in order to avoid a collision. A common example of user-based feedback is the feedback of a warning. The feedback subsystem can issue visual warnings, audio warnings, and/or haptic warnings. Haptic warnings include display modalities that are perceived by the human sense of touch or feeling. Haptic displays can include tactile (sense of touch) and proprioceptive (sense of pressure or resistance). Examples of user-based haptic feedback include steering wheel shaking, and seat belt tensioning.

In addition to user-based feedback, the feedback subsystem 600 can also initiate vehicle-based feedback. Vehicle-based feedback does not rely exclusively on the user to act in order to avoid a collision. The feedback subsystem 600 could automatically reduce the speed of the vehicle, initiate braking, initiate pulse breaking, or initiate accelerator counterforce. In a preferred embodiment of the system 100 using a forward looking sensor, the feedback subsystem 600 can change the velocity of a vehicle 102 invoking speed control such that a collision is avoided by reducing the relative velocities of the vehicles to zero or a number approaching zero. This can be referred to as "virtual towing." In all embodiments of the system 100, the user should be able to override vehicle-based feedback. In some embodiments of the system 100, the user can disable the feedback subsystem 600 altogether.

Both user-based feedback and vehicle-based feedback should be configured in accordance with sound ergonomic principles. Feedback should be intuitive, not confuse or startle the driver, aid in the user's understanding of the system 100, focus the user's attention on the hazard, elicit an automatic or conditioned response, suggest a course of action to the user, not cause other collisions to occur, be perceived by the user above all background noise, be distinguishable from other types of warning, not promote risk taking by the user, and not compromise the ability of the user to override the system 100.

Moreover, feedback should vary in proportion to the level of the perceived threat. In a preferred embodiment of the system 100 that includes the use of a forward looking sensor, the feedback subsystem 600 assigns potential threats to one of several predefined categories, such as for example: (1) no threat, (2) following to closely, (3) collision warning, and (4) collision imminent. In a preferred automotive embodiment, the feedback subsystem 600 can autonomously drive the vehicle 102, change the speed of the vehicle 102, identify lane changes/merges in front and behind the vehicle 102, issue warnings regarding front and rear collisions, provide night vision to the user, and other desired functions.

A wide variety of different feedback heuristics can be utilized by the system 100 in determining when and how to provide feedback. All such heuristics should incorporate a desire to avoid errors in threat assessment and feedback. Potential errors include false alarms, nuisance alarms, and missed alarms. False alarms are situations that are misidentified as threats. For example, a rear-end collision alarm triggered by on-coming traffic in a different lane in an intersection does not accurately reflect a threat, and thus constitutes a false alarm. Missed alarms are situations when an imminent threat exists, but the system 100 does not respond. Nuisance alarms tend to be more user specific, and relate to alarms that are unnecessary for that particular user in a particular situation. The threat is real, but not of a magnitude where the user considers feedback to be valuable. For example, if the system incorporates a threat sensitivity that is too high, the user will be annoyed with "driving to close" warnings in situations where the driver is comfortable with the distance between the two vehicles and environmental conditions are such that the driver could react in time in the leading car were to slow down.

Different embodiments of the system 100 can require unique configurations with respect to the tradeoffs between missed alarms on the one hand, and nuisance alarms and false alarms on the other. The system 100 should be configured with predetermined error goals in mind. The actual rate of nuisance alarms should not be greater than the predetermined nuisance alarm rate goal. The actual rate of false alarms should not be greater than the predetermined false alarm rate goal. The actual rate of missed alarms should not be greater than the predetermined missed alarm rate goal. Incorporation of heuristics that fully utilize user-based attributes is a way to reduce nuisance alarms without increasing missed alarms. Tradeoffs also exist between the reaction time constraints and the desire to minimize nuisance alarms. User-based attributes are useful in that tradeoff dynamic as well.

Predefined modes of vehicle operation can also be utilized to mitigate against some of the tradeoffs discussed above. Driving in parking lots is different than driving on the expressway. Potential modes of operation can include headway maintenance, speed maintenance, and numerous other categories. Modes of vehicle operation are described in greater detail below.

No system 100 can prevent all vehicle 102 collisions. In a preferred embodiment of the system 100, if an accident occurs, information from the system 100 can be used to detect the accident and if the vehicle is properly equipped, this information can be automatically relayed via a "mayday" type system (an "accident information transmitter module") to local authorities to facilitate a rapid response to the scene of a serious accident, and to provide medical professionals with accident information that can be useful in diagnosing persons injured in such an accident.

III. Sensor Data

Figure 3:
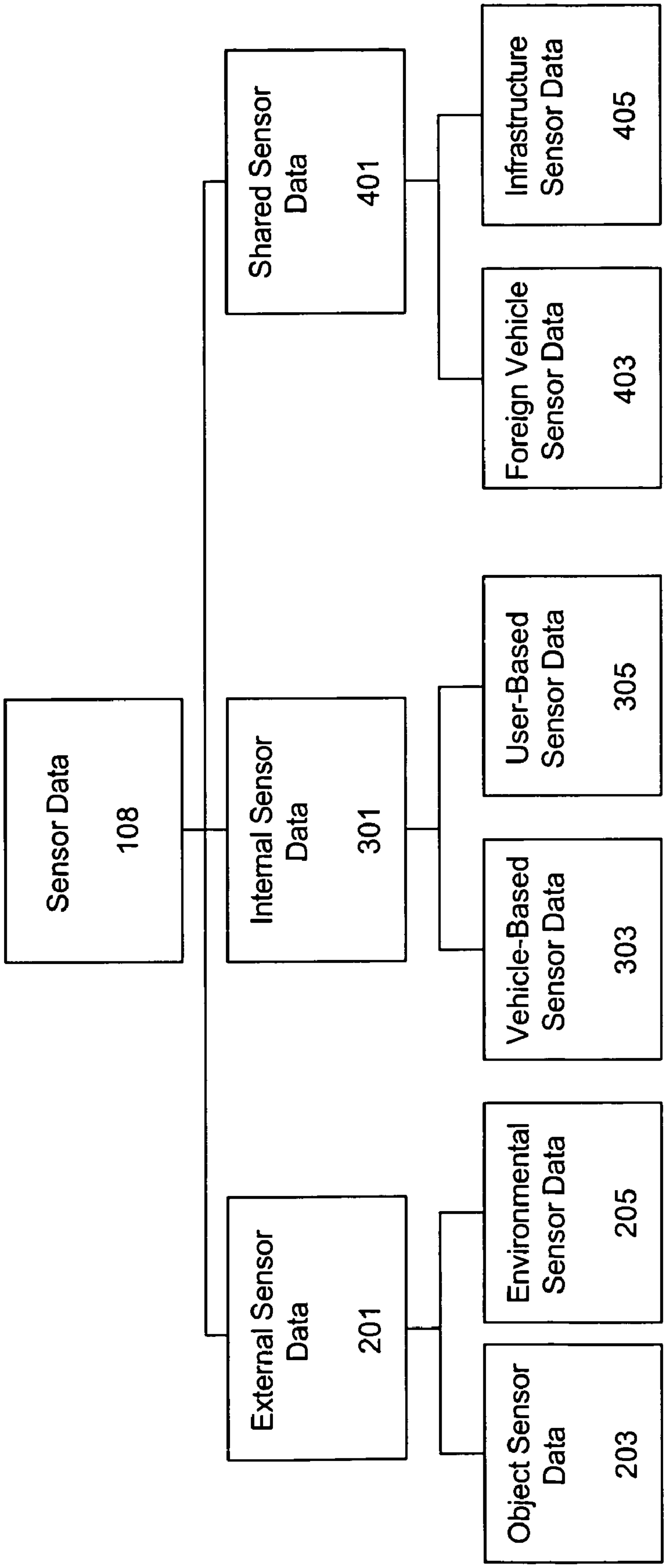
FIG. 3 is a data hierarchy diagram illustrating some of the different types of sensor data that can be used by the invention.

As discussed above, the system 100 is capable of capturing a wide variety of sensor data 108. FIG. 3 is a data diagram illustrating some of the different categories and sub-categories of sensor data 108. These categories relate closely to the types of sensors employed by the system 100.

A. External Sensor Data

The sensor data 108 captured by the external sensor subsystem 200 is external sensor data 201. External sensor data 201 can include object sensor data 203 and environmental sensor data 205. Object sensor data 203 includes any captured data relating to objects 106, including foreign vehicles 104. Thus, object sensor data can include position, velocity, acceleration, height, thickness, and a wide variety of other object attributes.

Environmental sensor data 205 includes information that does not relate to a particular object 106 or vehicle 104. For example, traffic conditions, road conditions, weather conditions, visibility, congestion, and other attributes exist only in the aggregate, and cannot be determined in relation to a particular object. However, such information is potentially very helpful in the processing performed by the system 100.

B. Internal Sensor Data

The sensor data 108 captured by the internal sensor subsystem 300 is internal sensor data 301. Internal sensor data 301 can include user-based sensor data 305 and vehicle-based sensor data 303.

Vehicle-based sensor data 303 can include performance data related to the vehicle 102 (breaking capacity, maneuverability, acceleration, acceleration capacity, velocity, velocity capacity, etc) and any other attributes relating to the vehicle 102 that are potentially useful to the system 100. The analysis of potential threats should preferably incorporate differences in vehicle attributes and differences in user attributes.

As discussed above, user-based attributes 305 can include breaking level preferences, experience with a particular vehicle, alertness, and any other attribute relating to the user that is potentially of interest to the analysis subsystem 500 and the feedback subsystem 600.

C. Shared Sensor Data

The sensor data 108 captured by the shared information subsystem 400 is shared sensor data 401, and can include foreign vehicle sensor data 403 and infrastructure sensor data 405. Shared sensor data 401 is either external sensor data 201 and/or internal sensor data 301 that has been shared by a foreign vehicle 104 or by an infrastructure sensor 110. Thus, any type of such data can also be shared sensor data 401.

The source of share sensor data 401 should impact the weight given such data. For example, the best evaluator of the velocity of a foreign vehicle 104 is likely the internal sensors of that vehicle 104. Thus, share sensor data from the foreign vehicle 104 in question should be given more weight than external sensor data from the source vehicle 102, especially in instances of bad weather.

Infrastructure sensor data 405 is potentially desirable for a number of reasons. Since such sensors are typically non-moving, they do not have to be designed with the motion constraints of a vehicle. Thus, non-moving sensors can be larger and potentially more effective. A network of infrastructure sensors can literally bring a world of information to a host vehicle 102. Thus, infrastructure sensors may be particularly desirable with respect to traffic and weather conditions, road surface conditions, road geometry, construction areas, etc.

IV. External Sensor Zones

Figure 4:
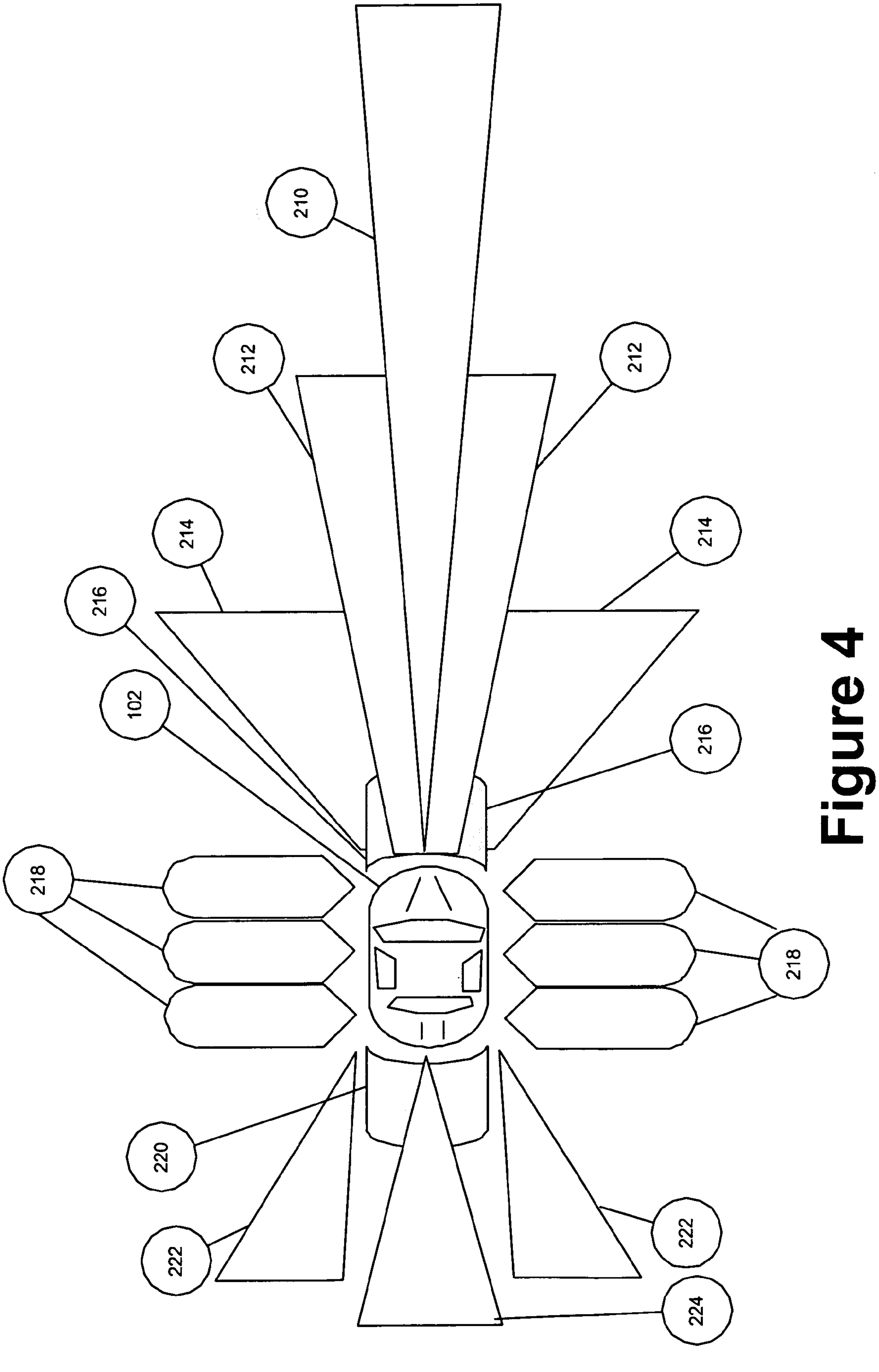
FIG. 4 is an illustration of some of the external sensor zones that can be incorporated into an automotive embodiment of the invention.

FIG. 4 is a diagram illustrating one embodiment of an external sensor subsystem 200. The diagram discloses many different sensor zones. In a preferred embodiment, each zone uses a particular sensor type and focuses on a particular type of obstruction/hazard.

A forward long-range sensor can capture sensor data from a forward long-range sensor zone 210. Data from the forward long-range zone 210 is useful for feedback relating to autonomous driving, collision avoidance, collision warnings, adaptive cruise control, and other functions. Given the long-range nature of the sensor zone, radar is a preferred sensor type.

A forward mid-range sensor can capture sensor data from a forward mid-range sensor zone 212. The mid-range zone 212 is wider than the long-range zone 210, but the mid-range zone 212 is also shorter. Zone 212 overlaps with zone 210, as indicated in the Figure. Zone 212 can be especially useful in triggering night vision, lane tracking, and lateral vehicle control.

A forward short-range sensor can capture sensor data from a forward short-range sensor zone 214. The short-range zone 214 is wider than the mid-range zone 212, but the short-range zone 214 is also shorter. Zone 214 overlaps with zone 212 and zone 210 as indicated in the Figure. Data from the short-range zone 214 is particularly useful with respect to pre-crash sensing, stop and go adaptive cruise control, and lateral vehicle control.

Near-object detection sensors can capture sensor data in a front-near object zone 216 and a rear near object zone 220. Such zones are quite small, and can employ sensors such as ultra-sonic sensors which tend not to be effective a longer ranges. The sensors of zones 216 and 220 are particularly useful at providing backup aid, backing collision warnings, and detecting objects that are very close to the vehicle 102.

Side sensors, which can also be referred to as side lane change/merge detection sensors capture sensor data in side zones 218 that can also be referred to as lane change/merge detection zones 218. Sensor data from those zones 218 are particularly useful in detecting lane changes, merges in traffic, and pre-crash behavior. The sensor data is also useful in providing low speed maneuverability aid.

Rear-side sensors, which can also be referred to as rear lane change/merge detection sensors, capture sensor data in rear-side zones 222 that can also be referred to as rear lane change/merge detection zones 222.

A rear-straight sensor can capture sensor data from a rear-straight zone 224. Sensor data from this zone 224 is particular useful with respect to rear impact collision detection and warning.

V. Modular View

Figure 5:
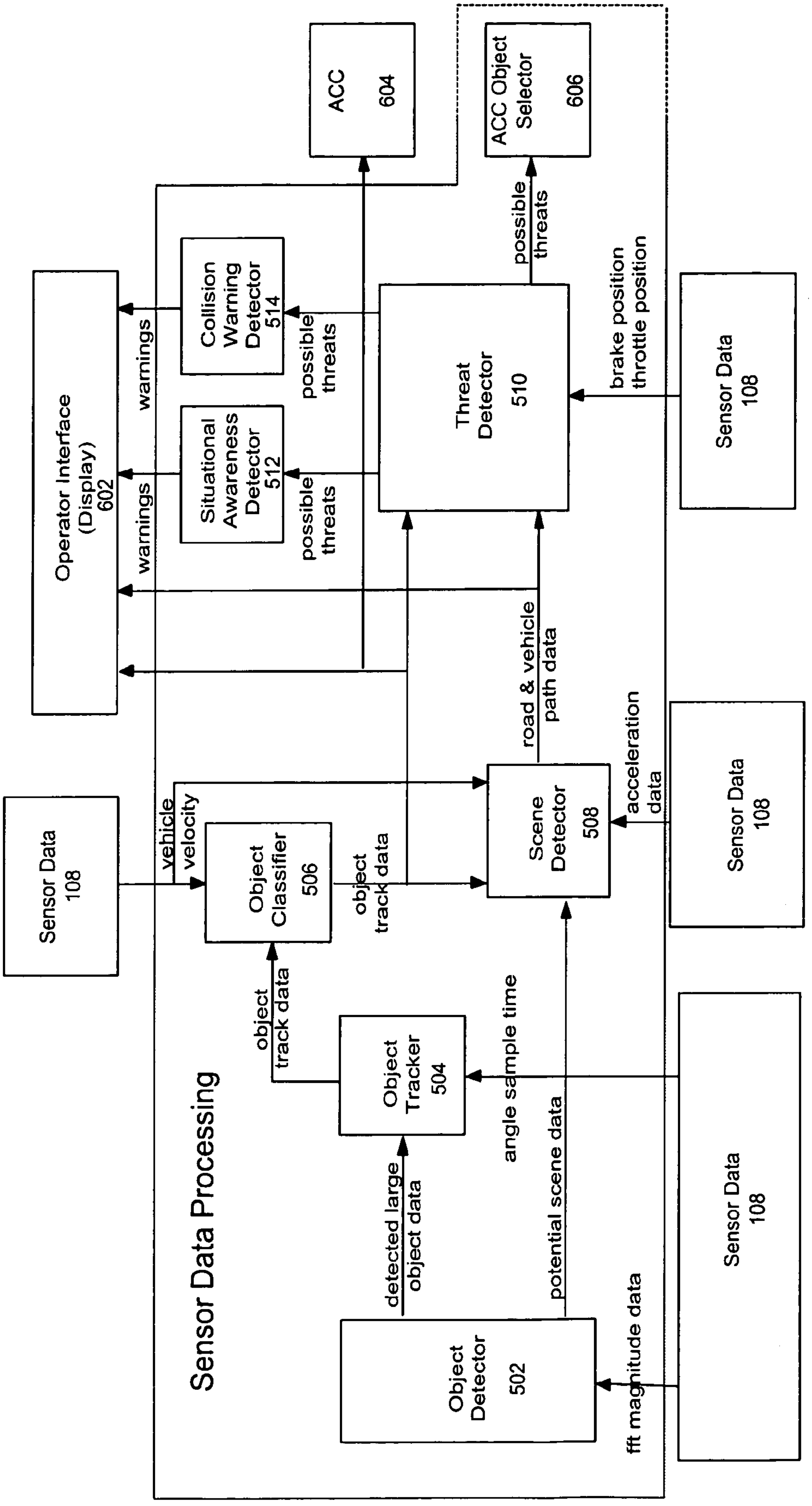
FIG. 5 is a block diagram illustrating one example of sensor processing incorporating sensor data from multiple sensors.

FIG. 5 is an illustration of the system 100 that includes some of the various modules that can be incorporated into the system 100. In some preferred embodiments of the system 100, the software components used by the various modules are implemented in the system 100 as software objects using object-oriented programming techniques. In such embodiments, each module can have one or more "objects" corresponding to the functionality of the module. In alternative embodiments, a wide variety of different programming techniques are used to create the modules described below.

In a preferred embodiment, sensor data 108 is utilized from all three input subsystems in a comprehensive, integrated, and weighted fashion.

In a system 100 that incorporates forward-looking radar information to perform forward collision warnings, baseband radar data is provided to an object detector module 502. The baseband radar takes the raw data from the radar sensor and processes it into a usable form. The baseband signal is amplified using a range law filter, sampled using an analog to digital converter, windowed using a raised cosine window, converted to the frequency domain using a fast fourier transform (FFT) with a magnitude approximation. The resultant data represents a single azimuth sample and up to 512 range samples at 0.5 meters per sample. A forward-looking radar application uses preferably between 340 and 400 of these samples (170–200 meter maximum range). The sensor data 108 for the object detector 502 is preferably augmented with shared sensor data 401 and internal sensor data 301.

An object detector module 304 performs threshold detection on FFT magnitude data and then combines these detections into large objects and potential scene data ("object detector heuristic"). In non-baseband radar embodiments, different object detector heuristics can be applied. Objects should be classified in order that the analysis subsystem 500 can determine the threat level of the object. Objects can be classified based upon: absolute velocity, radar amplitude, radar angle extent, radar range extent, position, proximity of other objects, or any other desirable attribute. A variety of different object detector heuristics can be applied by the object detector module.

In a baseband radar embodiment, the system 100 utilizes a narrow beam azimuth antenna design with a 50% overlap between adjacent angle bins. This information can be used to determine object angular width by knowing the antenna gain pattern and using that information with a polynomial curve fit and/or interpolation between the azimuth angle bins. The ability to perform range and angle grouping of objects is critical to maintaining object separation, which is necessary for the successful assessment of potential threats. A two dimensional grouping heuristic can be used to more accurately determine the range and angle extent of large objects for systems 100 that operate in primarily two dimensions, such the system 100 in automotive embodiments. This will simplify the object detector module 304 while providing better object classification and as an aid to scene processing.

Data relating to large objects is sent to an object tracker module 504. The object tracker module 504 uses an object tracker heuristic to track large objects with respect to position and velocity. Sensor module information such as angle sample time in a radar embodiment, should also be an input for the object tracker module 504 so that the system 100 can compensate for various sensor-type characteristics of the sensor data 108. A variety of different object tracking heuristics applied by the object tracking module 504.

Object tracking information can be sent to a object classifier module 506. The object classifier module 506 classifies objects tracked by the object tracker module 504 based on predefined movement categories (e.g. stationary, overtaking, receding, or approaching) and object type (e.g. non-vehicle or vehicle) using one of a variety of object tracking heuristics. The classification can be added to a software object or data structure for subsequent processing.

The object classifier module 506 sends object classification data to a scene detector module 508 applying one or more scene detection heuristics. The scene detector module 508 can process the detected objects (large and small, vehicles and non-vehicles) and from this data predict the possible roadway paths that the vehicle might take. In a preferred embodiment, the scene detector module 508 incorporates user-based attributes, vehicle-based attributes, and/or shared sensor data in assisting in this determination.

The scene detector module 508 can utilize information from the various input subsystems to predict the path of the host vehicle 102. It is desirable to estimate the path of the host vehicle 102 in order to reduce nuisance alarms to the user for conditions when objects out of the vehicle path are included as threats. The scene detector module 508 should use both vehicular size objects and roadside size objects in this determination. It is important that the radar have sufficient sensitivity to detect very small objects (<<1 $m^2$) so this information can be used to predict the roadway. The threat level of an object is determined by proximity to the estimated vehicular path, or by proximity to roadside objects.

The first heuristic for scene detection and path prediction (collectively scene detection) is to use the non-vehicular objects by identifying the first non-vehicular object in each azimuth sample then connecting these points together between azimuth angles ("azimuth angle scene detection heuristic"). The resultant image can then low pass filtered and represents a good estimation of the roadway feature edge. The constant offset between the roadway feature edge and the vehicular trajectory represents the intended path of the host vehicle.

A second example of a scene detection heuristic (the "best least squares fit scene detection heuristic") is to use the stationary object points to find the best least squares fit of a road with a leading and trailing straight section, of arbitrary length, and a constant radius curvature section in between. The resultant vehicle locations can be used to determine lanes on the road and finely predict the vehicle path.

Another scene detection heuristic that can be used is the "radius of curvature scene detection heuristic" which computes the radius of curvature by using the movement of stationary objects within the field of view. If the road is straight, then the stationary objects should move longitudinally. If the roadway is curved, then the stationary points would appear to be rotating around the center of the curvature.

The system 100 can also use a "yaw rate scene detection heuristic" which determines vehicle path by using yaw rate information and vehicle speed. While in a constant radius curve the curvature could be easily solved and used to augment other path prediction processing (e.g. other scene detection heuristics).

The system 100 can also use a multi-pass fast convolution scene detection heuristic to detect linear features in the two dimensional radar image. The system 100 is not limited to the use of only one scene detection heuristic at a time. Multiple heuristics can be applied, with information integrated together. Alternatively, process scene data can combine the radar image with data from a Global Positioning System (GPS) with a map database and/or vision system. Both of these supplemental sensors can be used to augment the radar path prediction algorithms. The GPS system would predict via map database the roadway ahead, while the vision system would actively track the lane lines, etc., to predict the travel lane ahead.

The estimated path of the host vehicle 102 can be determined by tracking vehicles 104 in the forward field of view, either individually or in groups, and using the position and trajectory of these vehicles 104 to determine the path of the host vehicle 102.

All of these scene processing and path prediction heuristics can be used in reverse. The expected path prediction output can be compared with the actual sensory output and that information can be used to assess the state of the driver and other potentially significant user-based attributes. All of these scene processing and path prediction heuristics can be augmented by including more data from the various input subsystems.

A threat detector module 510 uses the input from the scene and path detector module 508. The threat detector module 510 applies one or more threat detection heuristics to determine what objects present a potential threat based on object tracking data from the object tracker module 504 and roadway data from the scene detector module 508. The threat detector module 318 can also incorporate a wide range of vehicle-based attributes, user-based attributes, and shared sensor data in generating an updated threat assessment for the system 100.

A collision warning detector module 514 can be part of the analysis subsystem 500 or part of the feedback subsystem 600. The module 514 applies one or more collision warning heuristics that process the detected objects that are considered potential threats and determine if a collision warning should be issued to the driver.

With threat sensitivity configured correctly into the system 100 the system 100 can significantly reduce accidents if the system 100 is fully utilized and accepted by users. However, no system can prevent all collisions. In a preferred embodiment of the system 100, if an accident occurs, information from the system 100 can be used to detect the accident and if the vehicle is properly equipped, this information can be automatically relayed via a "mayday" type system (an "accident information transmitter module") to local authorities to facilitate a rapid response to the scene of a serious accident, and to provide medical professionals with accident information that can be useful in diagnosing persons injured in such an accident.

The threat detector module 510 can also supply threat assessments to a situational awareness detector module 512. The situational awareness detector module 512 uses a situational awareness heuristic to process the detected objects that are considered potential threats and determines the appropriate warning or feedback.

The situational awareness heuristics can be used to detect unsafe driving practices. By having the sensor process the vehicle-to-vehicle and vehicle-to-roadside scenarios, the state of the user can be determined such as impaired, inattentive, etc.

Other situations can be detected by the system 100 and warnings or alerts provided to the user. For example, the detection of dangerous cross wind gusts can be detected by the system 100, with warnings provided to the user, and the appropriate compensations and adjustments made to system 100 parameters. System 100 sensor parameters can be used to determine tire skidding, low lateral g-forces in turns, excessive yaw rate in turns, etc.

In a preferred automotive environment, any speed control component is an adaptive cruise control (ACC) module 604 allowing for the system 100 to invoke vehicle-based feedback. An ACC object selector module 606 selects the object for the ACC module to use in processing.

As mentioned above, the inputs to the system 100 should preferably come from two or more sensors. So long as sensors zones and sensor types are properly configured, the more information sources the better the results. Sensor data 108 can include acceleration information from an accelerometer that provides lateral (left/right) acceleration data to the system 100. A longitudinal accelerometer can also be incorporated in the system 100. The accelerometer is for capturing data relating to the vehicle hosting (the "host vehicle"). Similarly, a velocity sensor for the host vehicle 102 can be used in order to more accurately invoke the object classifier module 506.

The system 100 can also interact with various interfaces. An operator interface 602 is the means by which a user of a vehicle 102 receives user-based feedback. A vehicle interface 316 is a means by which the vehicle itself receives vehicle-based feedback.

VI. System/Vehicle "States" and "Modes"

In order to facilitate accurate processing by the system 100, the system 100 can incorporate predefined states relating to particular situations. For example, backing into a parking space is a potentially repeated event with its own distinct set of characteristics. Distinctions can also be made for expressway driving, off-road driving, parallel parking, driving on a two-way streets versus one way streets, and other contexts.

Figure 6:
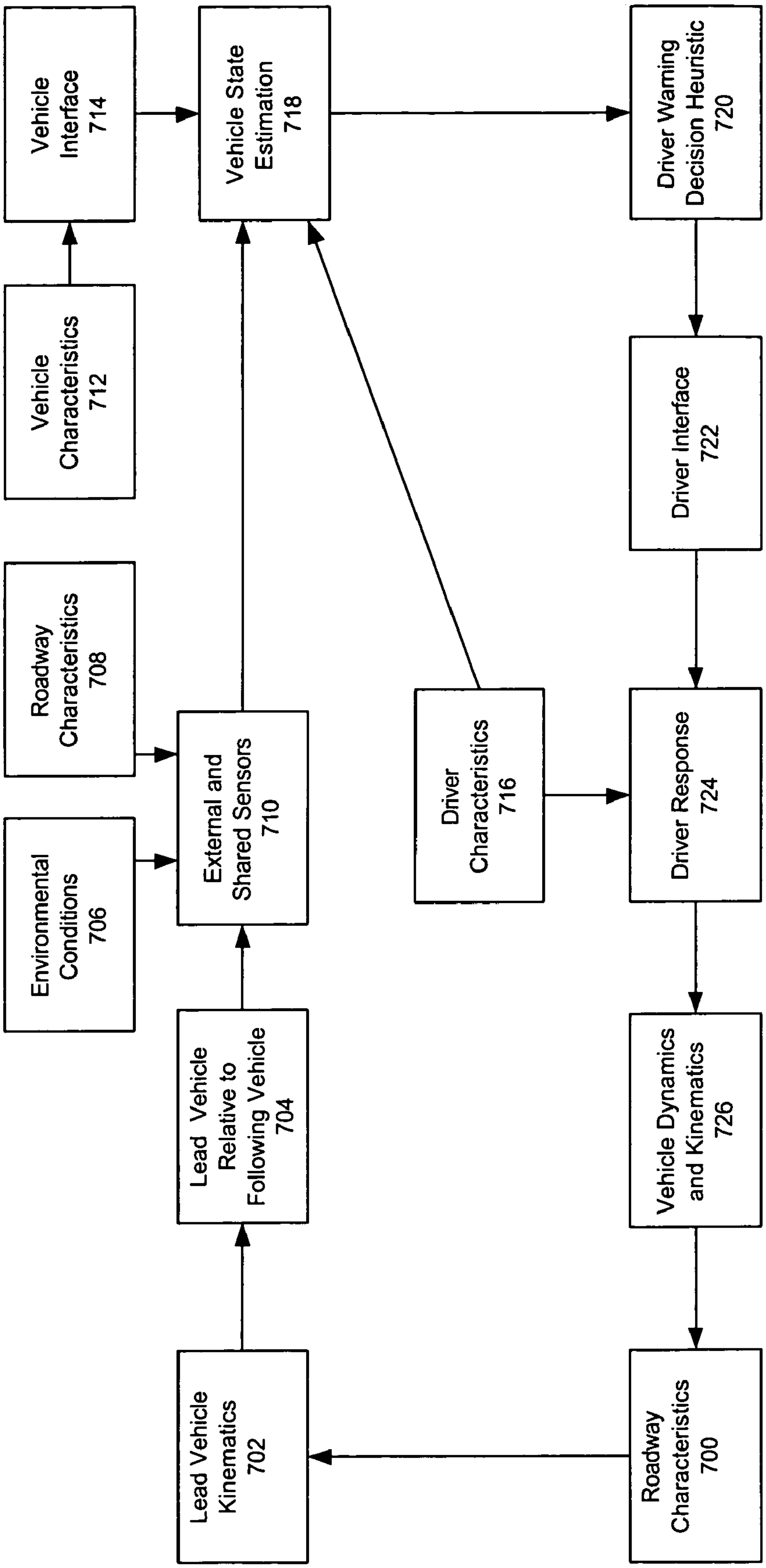
FIG. 6 is a block diagram illustrating an example of creating a vehicle/system state estimation.

FIG. 6 illustrates one example of a process for identifying the state or mode of a lead vehicle 104. Roadway characteristics are inputted at 700. External sensors and shared sensors are used to obtain kinematic information at 702 relating to the lead vehicle 104. Internal sensors at 704 can determine the lead vehicle 104 kinematics relative to the following or host vehicle 102.

Environmental conditions at 706 and roadway characteristics at 708 are used to put external and shared sensor data at 710 in context. Internal vehicle characteristics at 712 are communicated through a vehicle interface at 714, and integrated with the information at 710 to generate a state or mode estimate regarding the leading vehicle 104 at 718. The state/mode determination can also incorporate driver characteristics at 716. The state/mode information at 718 can then be used at 720 in applying a warning decision heuristic or other form of feedback. Such feedback is provided through a driver interface at 722, which can result in a user response at 724. The user response at 724, leads to different dynamics and kinematic information at 726, thus causing the loop to repeat itself.

Figure 7:
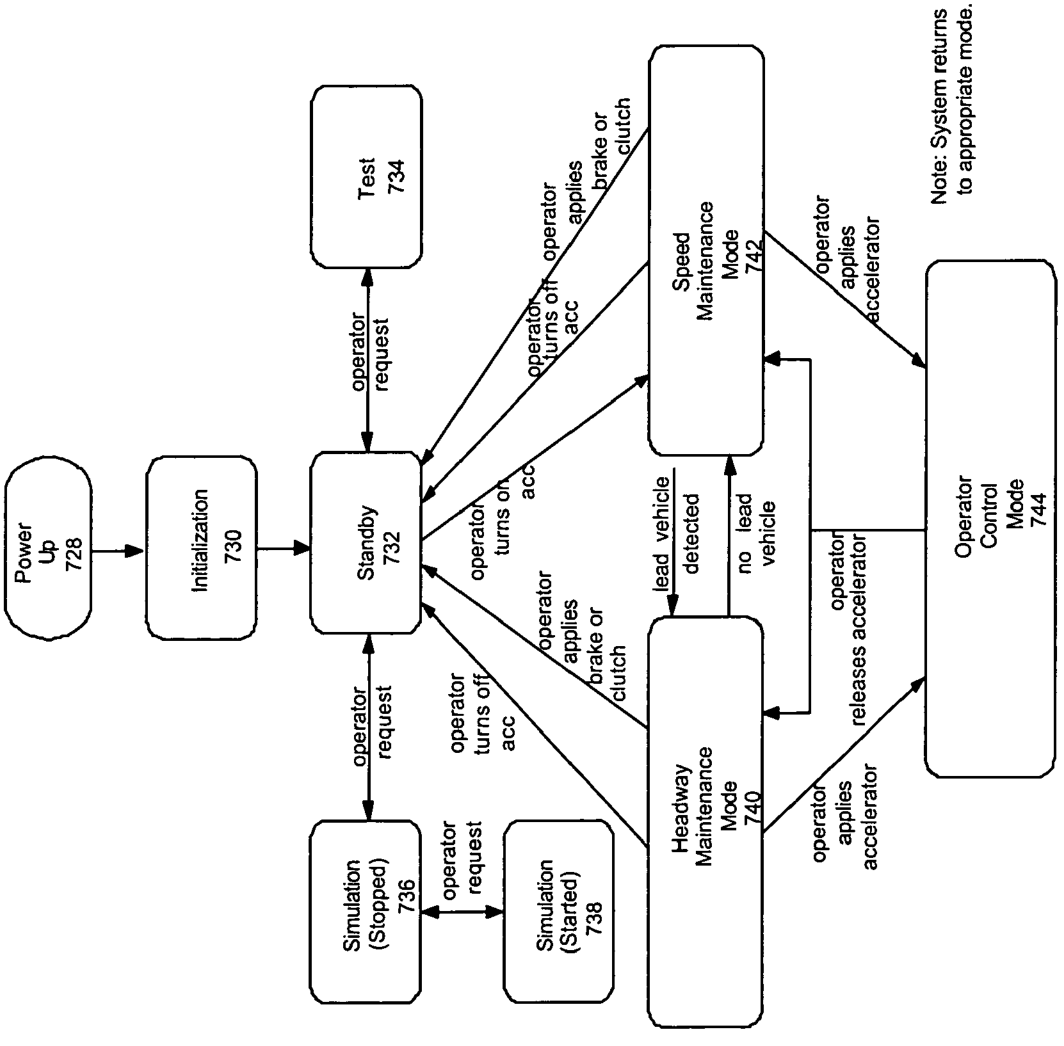
FIG. 7 is a state diagram illustrating some of the various states of an automotive embodiment of a vehicle sensor system.

FIG. 7 is a "state" view of the system 100 with an adaptive cruise control module. In a preferred embodiment of the system 100 where object-oriented programming techniques are used to build the system 100, the system 100 is represented by a system object and the system object can be capable of entering any of the states illustrated in the Figure. The behavior of the system object can be expressed as a combination of the state behavior expressed in this section and/or the concurrent behavior of the other "objects" that the system 100 is composed of. The Figure shows the possible states of the system object and the events that cause a change of state. A "states" can be made up of one or more "modes" meaning that several "modes" can share the same "state."

In a preferred automotive embodiment, the system 100 is invoked by the start of the ignition. In alternative embodiments, a wide variety of different events can trigger the turning on of the system 100. Regardless of what the "power-up" trigger is, the system 100 must begin with a power up event 728. The power up event is quickly followed by an initialization state 730. The initialization of system data items during power up is performed in the "initialization" state 730.

After all initialization processing is complete, in some embodiments of the system 100, the system 100 enters into a standby state 732. The standby state 732 allows the user to determine which state the system will next enter, a test state 734, a simulation state 736, or an operational state such as a headway maintenance mode state 740, a speed maintenance mode state 742, or an operator control mode 744. In alternative embodiments of the system 100, there can be as few as one operational state, or as many operational modes as are desirable for the particular embodiment.

The "test" state 734 provides capabilities that allow engineering evaluation or troubleshooting of the system. Examining FFT magnitude data is one example of such a test. Alternative embodiments may include two distinct test states, a test stopped state and a test started state.

In a preferred embodiment of the system 100, the user invoke a simulation component causing the system to enter a simulated state where sensor data previously stored in a data storage module can be used to evaluate the performance of the system 100 and to allow the user to better calibrate the system 100. The system 100 performs a simulation in the simulation (started) state 736 on a file of stored FFT data selected by the operator. In a simulation (stopped) state, the system 100 is stopped waiting for the operator to start a simulation on stored FFT data or return to an operational state.

In a preferred embodiment of the system 100, the default mode for the operational state is the speed maintenance mode 742. If no lead vehicle is detected, the system 100 will remain in the speed maintenance mode 742. If a lead vehicle is detected, the system 100 transitions to a headway maintenance mode 740. As discussed above, different embodiments may use a wide variety of different modes of being in an operational state. By possessing multiple operational modes, the analysis subsystem 300 can invoke threat assessment heuristics that are particularly well suited for certain situations, making the system 100 more accurate, and less likely to generate nuisance alarms.

As is illustrated in the Figure, user actions such as turning off the ACC module, turning on the ACC module, applying the brakes, applying the accelerator, or other user actions can change the state of the system 100. Application of the accelerator will move the system 100 from an operational state at either 740 or 742 to an operational control mode 744. Conversely, releasing the accelerator will return the system 100 to either a speed maintenance mode 742 or a headway maintenance mode 740.

As mentioned above, additional modes can be incorporated to represent particular contexts such as parking, off-road driving, and numerous other contexts.

VII. Process Flows, Functions, and Data Items

The various subsystems and modules in the system 100 implement their respective functions by implementing one or more heuristics. Some of the process flows, functions, and data items are described below.

A. Object Classification Heuristics

Figure 8:
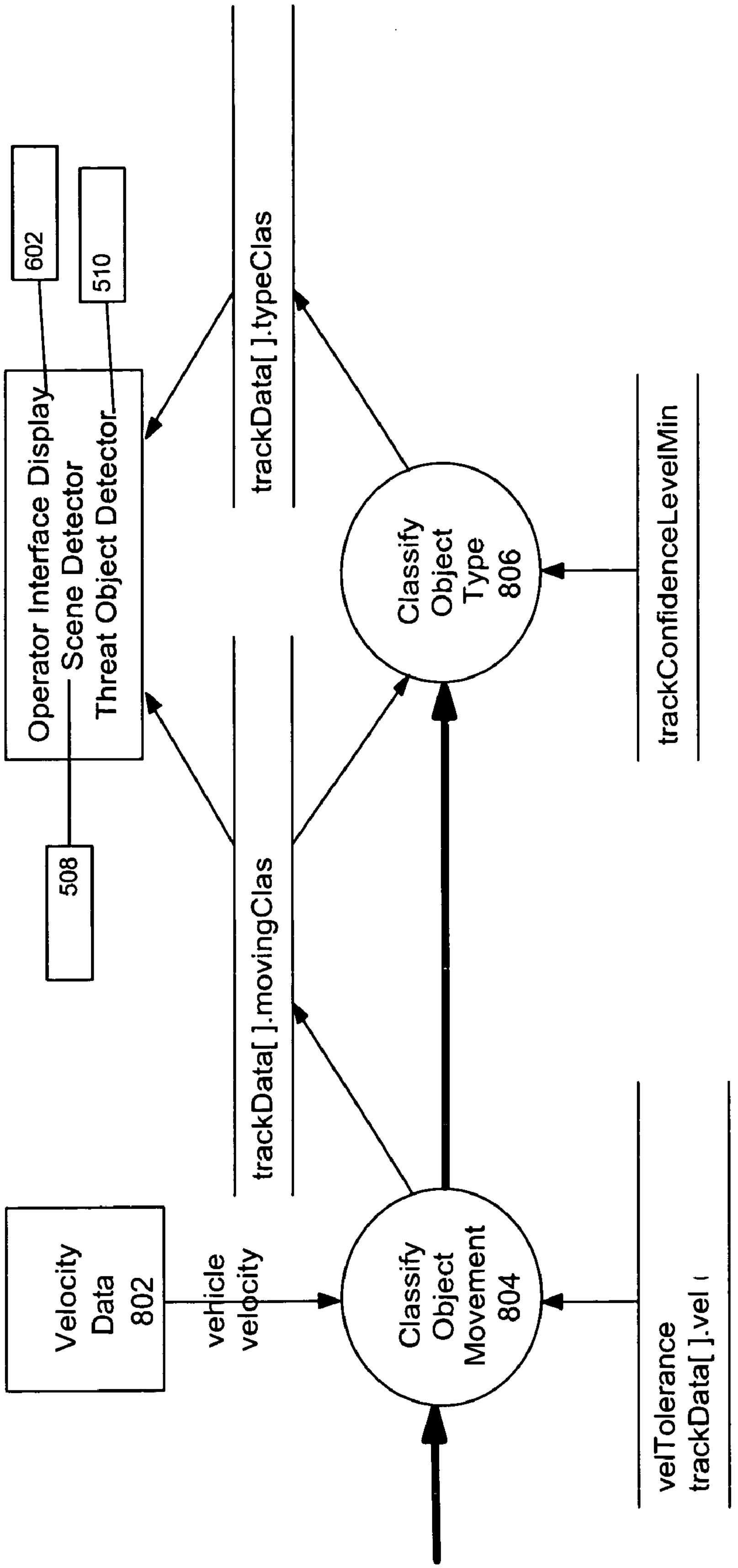
FIG. 8 is a data flow diagram illustrating one example of how objects can be classified in accordance with the movement of the object.

FIG. 8 is an illustration of a data flow diagram relating to the object classification module 506. Object movement is classified at 804. Velocity information 802 and other sensor data 108 can be incorporated into the classification of object movement at 804. In a preferred embodiment of the system 100, object movement is classified as either receding, following, overtaking, stationary, or approaching. In alternative embodiments of the system 100, different sets of movement categories can be used. The movement classification can then be sent to the operator interface display 602, the scene detector 508, the threat detector 510, and the object type classifier at 806. The object type classifier at 806 uses the movement classification from 804 to assist in the classification in the type of object. Object classification information can then be sent to the operator interface display 602, the scene detector 508, and the threat detector 510.

Some examples of the functions and data items that can support movement and object classification are described below:

ClassifyObjectMovement( )

Classifies the movement of tracked objects.

{

Set trackData[ ].moving Class for all tracked objects after every update of ObjectTracker.trackData[ ].vel

TABLE A

| | ObjectTracker.trackData[ ].movingClass Logic | |
|---|---|---|
| VelocitySensor.vehicleVelocity | ObjectTracker.trackData[ ].vel | ObjectTracker.trackData[ ].movingClass |
| X | >(velTolerance) | RECEDING |
| >=(velTolerance) | <(velTolerance) AND >(−velTolerance) | FOLLOWING |
| X | <(−velTolerance) AND >(−vehicleVelocity + velTolerance) | OVERTAKING |
| X | <(−vehicleVelocity + velTolerance) AND >(−vehicleVelocity − velTolerance) | STATIONARY |
| X | <=(−vehicleVelocity − velTolerance) | APPROACHING |

Note:
vehicleVelocity is from the VehicleInterface.VelocitySensor object and X = Don't Care.

}

ClassifyObjectType( )

Classifies the type of tracked object.

```
{
Perform the following for all tracked objects after each update of
ObjectTracker.trackData[ ].movingClass:
{
    if (an object is ever detected with
        ObjectTracker.trackData[ ].movingClass != STATIONARY
        and ObjectTracker.trackData[ ].confidenceLevel >=
    trackConfidenceLevelMin)
    {
    ObjectTracker.trackData[ ].typeClass = VEHICLE;
    }
    /* Note: ObjectTracker.trackData[ ].typeClass is initialized to NON_VEHICLE
    when the object is formed. */
}
```

velTolerance

Specifies the velocity tolerance for determining the moving classification of an object. This number can be changed from the Operator Interface Control object.

Default value=3 meters/second (approx. 6.7 MPH).

trackConfidenceLevelMin

Specifies the minimum trackData[ ].confidenceLevel before the trackData[ ].typeClass is determined. This number can be changed from the Operator Interface Control object.

Default value=20.

B. Object Detection and Scene Detection Heuristics

Figure 9:
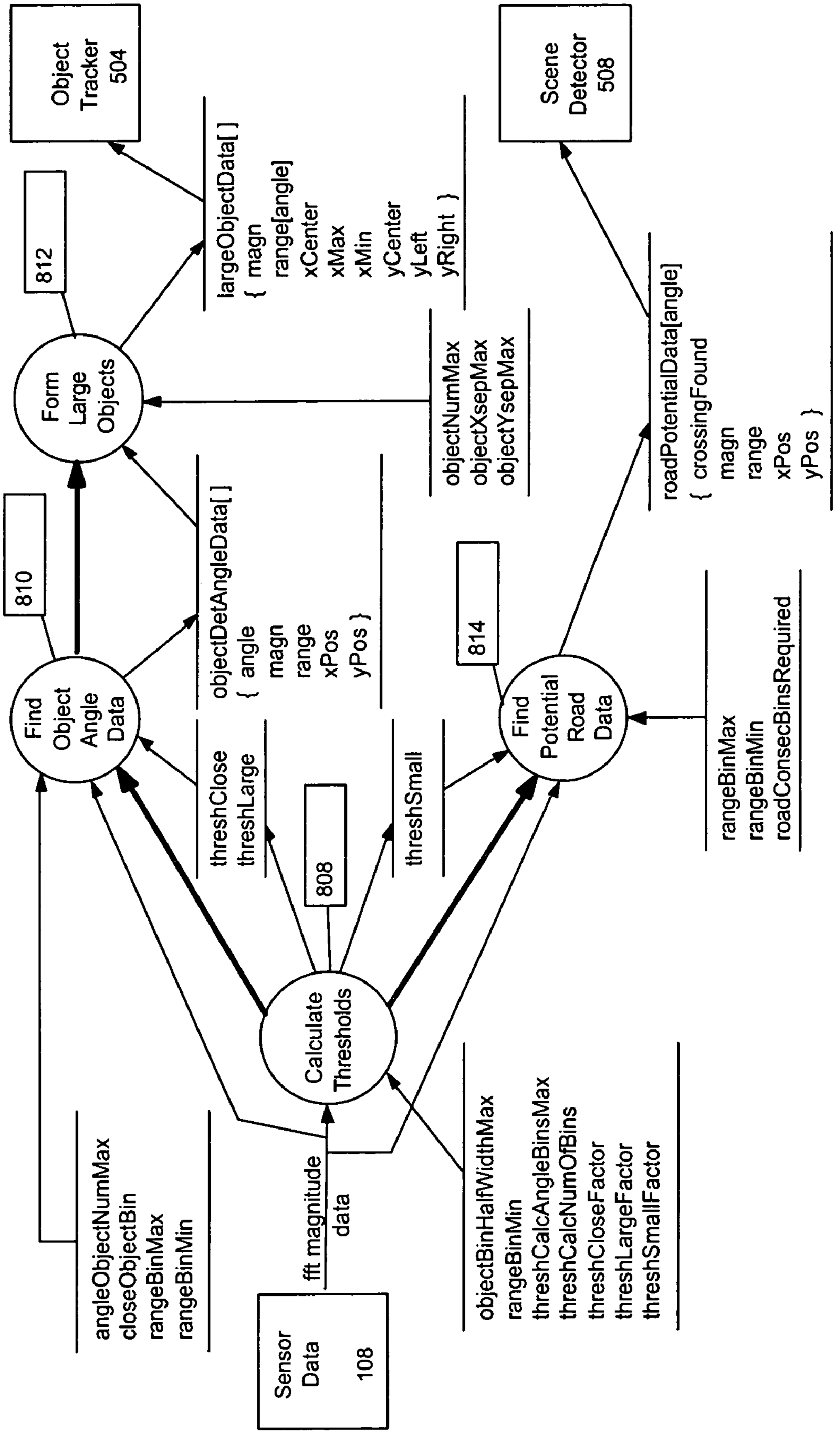
FIG. 9 is a data flow diagram illustrating one example of object identification and scene detection.

FIG. 9 is a process flow diagram illustrating one example of how sensor data 108 from the various input subsystems can be used by the object tracker module 504 and the scene detector module 508. As described above, the sensor data 108 can include FFT magnitude data so that thresholds can be calculated at 808. The sensitivity of the system 100 with respect to identifying scene data and foreign objects is determined by predetermined thresholds. Such thresholds also determine whether changes in sensor measurements are cognizable by the system 100.

At 810, angle information relating to large objects is captured. Contiguous range bins that have FFT magnitudes that cross the large threshold are presumed to be part of a single object. At 812, large (inter-bin) objects are formed by the system 100, and sent to the object tracker module 504 for subsequent processing.

At 814, FFT bins that are potentially part of the road edge are identified and sent to the scene detector 508.

Some examples of the functions and data items that can be used in the process flow diagram are illustrated below:

CalculateThresholds( )

Calculates thresholds from the Baseband radar object's FFT magnitude data. These thresholds are used for detecting objects.

```
{
Find the mean value (fftMagnMean) of the FFT magnitudes from multiple
angles (Baseband.fftMagnData[angle] [bin]) based on the following:
{
Include threshCalcNumOfBins bins in the calculation;
Include a maximum of threshCalcAngleBinsMax bins from each angle;
Do not include bins from an angle that are longer in range than the peak
FFT amplitude of that angle - objectBinHalfWidthMax;
Use range bins from each angle starting at rangeBinMin and going out in
range until one of the above constraints occurs;
Use angle bins in the following order: 9, 10, 8, 11, 7, 12, 6, 13, 5, 14, 4,
15, 3, 16, 2, 17, 1, 18, 0, 19 where angle bin 0 is the far left angle bin
and
```

-continued

```
angle bin 19 is the far right angle bin.
}
Find the standard deviation (fftMagnStdDev) of the bins included in the
determination of the mean (fftMagnMean) with the following calculation:
fftMagnStdDev = (Sum of the absolute values of
(Baseband.fftMagnData[angle] [bin] - fftMagnMean)) / (Number of
bins included in the sum);
    Calculate the threshold for large objects to be tracked by performing
    the following:
    {
        threshLarge = (threshLargeFactor * fftMagnStdDev) +
        fftMagnMean;
    }
    Calculate the threshold for detecting potential scene data by
    performing the following:
    {
        threshSmall = (threshSmallFactor * fftMagnStdDev) +
        fftMagnMean;
    }
    Calculate the threshold for detecting close in targets by performing
    the following:
    {
        threshClose = (threshCloseFactor * fftMagnStdDev) +
        fftMagnMean;
    }
}
```

FindObjectAngleData( )

Finds large objects within each angle bin and calculates/stores parameters of these objects. Contiguous range bins that have FFT magnitudes that cross the large threshold are considered part of a single object.

```
{
    Use a largeThreshold based on the following:
    {
        if (FFT bin <= closeObjectBin)
            largeThreshold = threshClose;
        else
            largeThreshold = theshLarge;
}
Form angle objects from FFT bins that have a
Baseband.fftMagnData[angle] [bin]
> largeThreshold (found above) based on the following:
{
    An angle object is confined to a single angle;
    Possible range bins are from rangeBinMin through rangeBinMax;
    Contiguous range bins that have FFT magnitudes that are above
    threshLarge are considered part of a single angle object;
    The maximum number of angle objects is angleObjectNumMax;
    Check angle bins in the following order: 9, 10, 8, 11, 7, 12, 6, 13, 5,
    14, 4, 15, 3, 16, 2, 17, 1, 18, 0, 19 where angle bin 0 is the far left
    angle bin and angle bin 19 is the far right angle bin;
}
```

Calculate and store parameters for each angle object found based on the following:

```
{
    objectDetAngleData.angle = angle of the angle object;
    objectDetAngleData.xPos = x coordinate position of the object's largest FFT
    magnitude bin;
    objectDetAngleData.yPos = y coordinate position of the object's largest FFT
    magnitude bin;
    objectDetAngleData.magn = largest FFT magnitude of bins forming the angle
    object;
    objectDetAngleData.range = Closest range bin in the angle object that has an FFT
    magnitude that crossed the large threshold;
  }
  objectDetAngleData.range[angle] = 0 for angles where none of the range bins
  crossed the threshold;
}
```

FindPotentialRoadData( )

Finds potential road edge data and calculates/stores parameters of this data.

```
{
    Find FFT bins that are potentially part of the road edge from each angle based on
    the following:
    {
        Check range bins in each angle starting at rangeBinMin and going out in range to
        rangeBinMax;
    Find first roadConsecBinsRequired consecutive range bins of an angle with
    Baseband.fftMagnData[angle][bin] > threshSmall;
}
```

Perform the following for the angles of FFT bins found above;

```
    {
        roadPotentialData[angle].crossingFound = TRUE;
        roadPotentialData[angle].magn = FFT magnitude of the closest range bin;
        roadPotentialData[angle].range = Closest range bin;
        Calculate (minimum resolution = ¼ meter) and store the following parameters in
        roadPotentialData[angle]:
        {
            xPos = X axis position of closest range bin;
            yPos = Y axis position of closest range bin;
    }
}
```

Perform the following for angles that do not have a threshold crossing:

```
    {
        roadPotentialData[angle].crossingFound = FALSE;
    }
}
```

FormLargeObjects( )

Forms large objects that span one or more angle bins from angle objects. Angle objects span one or more range bins within a single angle.

```
{
    Delete all previous large objects (largeObjectData[ ]);
    Initially make the first angle object the first large object by performing the
    following:
    {
        largeObjectData[0].xMax = objectDetAngleData[0].xPos;
        largeObjectData[0].xMin = objectDetAngleData[0].xPos;
        largeObjectData[0].yRight = objectDetAngleData[0].yPos;
        largeObjectData[0].yLeft = objectDetAngleData[0].yPos;
}
```

Form large objects from angle objects based on the following:

```
{
    Form a maximum of objectNumMax large objects;
    Add an angle object (objectDetAngleData[n]) to a large object
    (largeObjectData[m]) when all of the following conditions are met;
    {
        objectDetAngleData[n].xPos <= largeObjectData[m].xMax + objectXsepMax;
        objectDetAngleData[n].xPos >= largeObjectData[m].xMin − objectXsepMax;
        objectDetAngleData[n].yPos <= largeObjectData[m].yRight + objectYsepMax;
        objectDetAngleData[n].yPos >= largeObjectData[m].yLeft − objectYsepMax;
    }
```

Perform the following when an angle object is added to a large object:

```
{
    if (objectDetAngleData[n].xPos > largeObjectData[m].xMax)
        largeObjectData[m].xMax = objectDetAngleData[n].xPos;
    if (objectDetAngleData[n].xPos < largeObjectData[m].xMin)
        largeObjectData[m].xMin = objectDetAngleData[n].xPos;
```

-continued

```
    if (objectDetAngleData[n].yPos > largeObjectData[m].yRight)
        largeObjectData[m].yRight = objectDetAngleData[n].yPos;
    if (objectDetAngleData[n].yPos < largeObjectData[m].yLeft)
        largeObjectData[m].yLeft = objectDetAngleData[n].yPos;
    largeObjectData[m].range[objectDetAngleData[n].angle]
                                        = objectDetAngleData[n].range;
    /* Note: largeObjectData[m].range[angle] = 0 for angles without large threshold
    crossings. */
}
```

When an angle object does not satisfy the conditions to be added to an existing large object then make it a large object by performing the following:

```
    {
        largeObjectData[m].xMax = objectDetAngleData[n].xPos;
        largeObjectData[m]xMin = objectDetAngleData[n].xPos;
        largeObjectData[m].yRight = objectDetAngleData[n].yPos;
        largeObjectData[m].yLeft = objectDetAngleData[n].yPos;
        largeObjectData[m].range[objectDetAngleData[n].angle]
                                        = objectDetAngleData[n].range;
        /* Note: largeObjectData[m].range[angle] = 0 for angles without large threshold
        crossings. */
    }
}
```

Perform the following for all large objects that have been formed:

```
    {
        largeObjectData[m].xCenter = average of the objectDetAngleData[n].xPos it is
        composed of;
        largeObjectData[m].yCenter = average of the objectDetAngleData[n].yPos it is
        composed of;
        largeObjectData[m].magn = the largest objectDetAngleData[n].magn it is
        composed of;
    }
}
```

angleObjectNumMax

The maximum number of angle objects to be detected from one complete set of FFT samples (all angle bins). This number can be changed from the Operator Interface Control object.

Default value=100.

closeObjectBin

The closeThreshold is used as a threshold for FFT bins closer than closeObjectBin when detecting large objects. This number can be changed from the Operator Interface Control object.

Default value=40.

fftMagnMean

The mean value estimate of FFT magnitudes including multiple range bins and angle bins.

fftMagnStdDev

The standard deviation estimate of FFT magnitudes including multiple range bins and angle bins.

largeObjectData[ ]

Data for large objects that are found during the detection process. These objects can cover multiple angle bins.

```
{
    magn: Maximum FFT magnitude of any range bin the object consists of.
    range[angle]: Specifies the closest range bin in a given angle that has an FFT
    magnitude that crossed the large threshold in that angle. Set equal to zero for
    angles when none of the range bins crossed the large threshold.
    xCenter: Center x position of the object.
    xMax: Maximum x position the object extends to.
```

-continued

```
    xMin: Minimum x position the object extends to.
    yCenter: Center y position of the object.
    yLeft: Left most y position the object extends to.
    yRight: Right most y position the object extends to.
}
```

objectBinHalfWidthMax

The number of FFT bins on each side of a peak FFT amplitude bin that are to be excluded from threshold calculations. This number can be changed from the Operator Interface Control object.

Default value=20.

objectDetAngleData[ ]

Data for large objects that are found during the detection process in each angle. The objects are confined to one angle.

```
{
    angle: Angle of the angle object.
    magn: Largest FFT magnitude of bins forming the angle object.
    range: Closest range bin that has an FFT magnitude that crossed the large
    threshold.
    xPos: X position of the range bin with the highest FFT amplitude of the object in
    meters. Note: X position is measured parallel to the vehicle where x = 0 is at the
    vehicle, and x gets larger as the distance gets larger in front of the vehicle.
    yPos: Y position of the range bin with the highest FFT amplitude of the object in
    meters. Note: Y position is measured cross angle where y = 0 is at the vehicle, y <
    0 is to the left of the vehicle, and y > 0 is to the right of the vehicle.
}
```

objectNumMax

Maximum number of large objects that will be detected in one azimuth scan. This number can be changed from the Operator Interface Control object.

Default value=100.

objectXsepMax

The maximum separation that is allowed between an angle object's X coordinate and a large object's X coordinate in order for the angle object to be added to the large object. This number can be changed from the Operator Interface Control object.

Default value=2.5 meters.

objectYsepMax

The maximum separation that is allowed between an angle object's Y coordinate and a large object's Y coordinate in order for the angle object to be added to the large object. This number can be changed from the Operator Interface Control object.

Default value=2.5 meters.

rangeBinMax

The maximum range bin to look for detections. This number can be changed from the Operator Interface Control object.

Default value=339.

rangeBinMin

The minimum range bin to look for detections. This number can be changed from the Operator Interface Control object.

Default value=3.

roadConsecBinsRequired

Specifies the number of consecutive low threshold crossings (in range) required to have a potential road edge. This number can be changed from the Operator Interface object.

Default value=2.

roadPotentialData[angle]

Identifies potential road edge data for each angle.

```
{
    crossingFound: Indicates if a threshold crossing was found (TRUE or FALSE).
    magn: FFT magnitude of the range bin identified as the potential road edge.
    range: Range bin of the potential road edge.
    xPos: X position of the potential road edge.
    yPos: Y position of the potential road edge.
}
```

threshCalcAngleBinsMax

The maximum number of range bins from any one angle to be included in the threshold calculations. This number can be changed from the Operator Interface Control object.

Default value=16.

threshCalcNumOfBins:

The total number of range bins to be included in the threshold calculations. This number can be changed from the Operator Interface Control object.

Default value=64. Note: Making this a power of two allows implementing the divide as a shift.

threshClose

The threshold value to be used for detection of large objects that are to be tracked for FFT bins closer than or equal to closeObjectBin.

threshCloseFactor

The value to multiply the standard deviation in determination of the detection thresholds for large objects that are closer or equal to FFT bin=closeObjectBin. This number can be changed from the Operator Interface Control object.

Default value=20.

threshLarge

The threshold value to be used for detection of large objects that are to be tracked with FFT bins farther than closeObjectBin.

threshLargeFactor

The value to multiply the standard deviation in determination of the detection thresholds for large objects with FFT bins farther than closeObjectBin. This number can be changed from the Operator Interface Control object.

Default value=50.

threshSmall

The threshold value to be used for detecting potential scene data.

threshSmallFactor

The value to multiply the standard deviation in determination of the detection thresholds for small objects. This number can be changed from the Operator Interface Control object. Default value=10.

C. Object Tracker Heuristics

Figure 10:
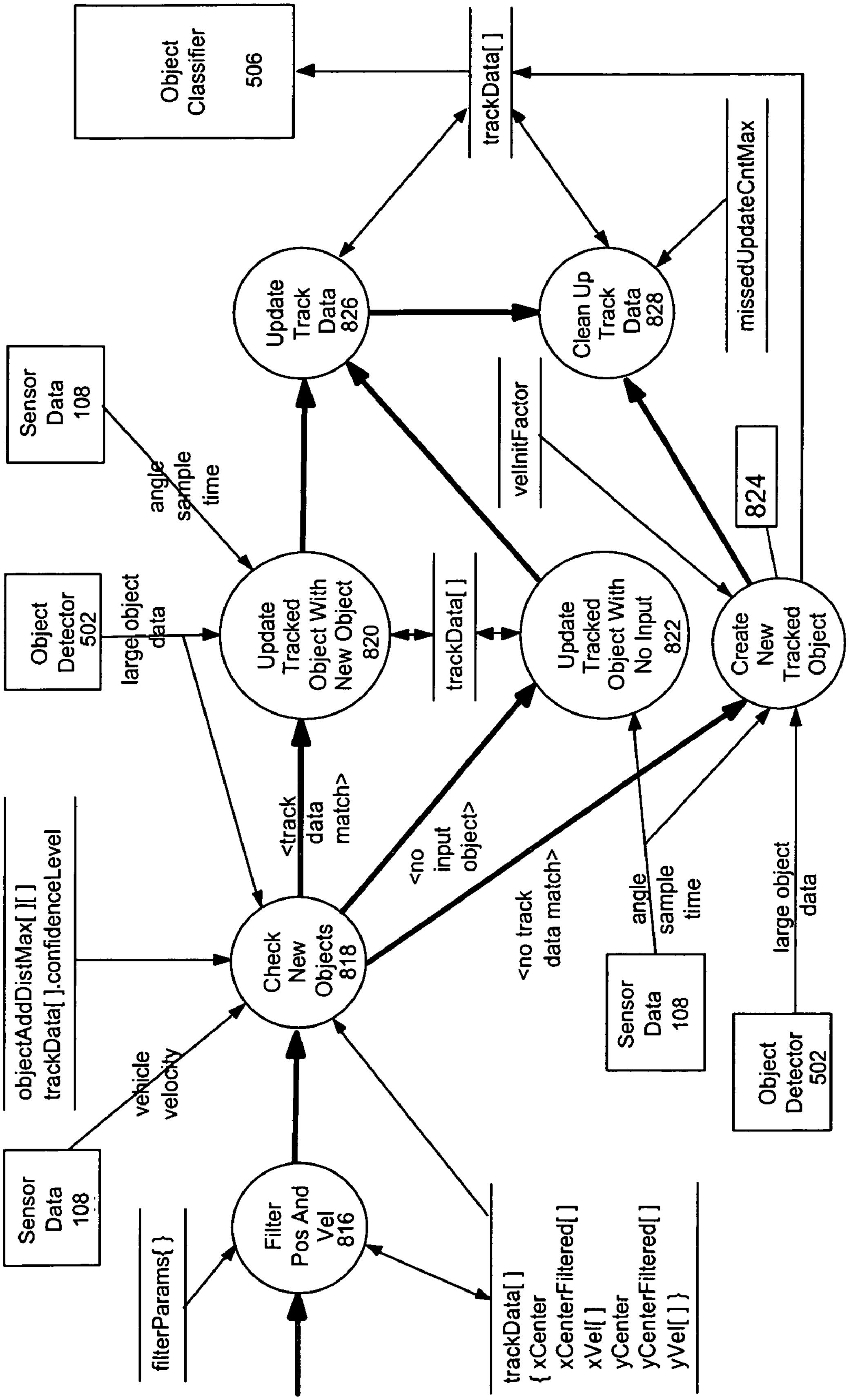
FIG. 10 is a data flow diagram illustrating one example of object tracking.
Figure 11:
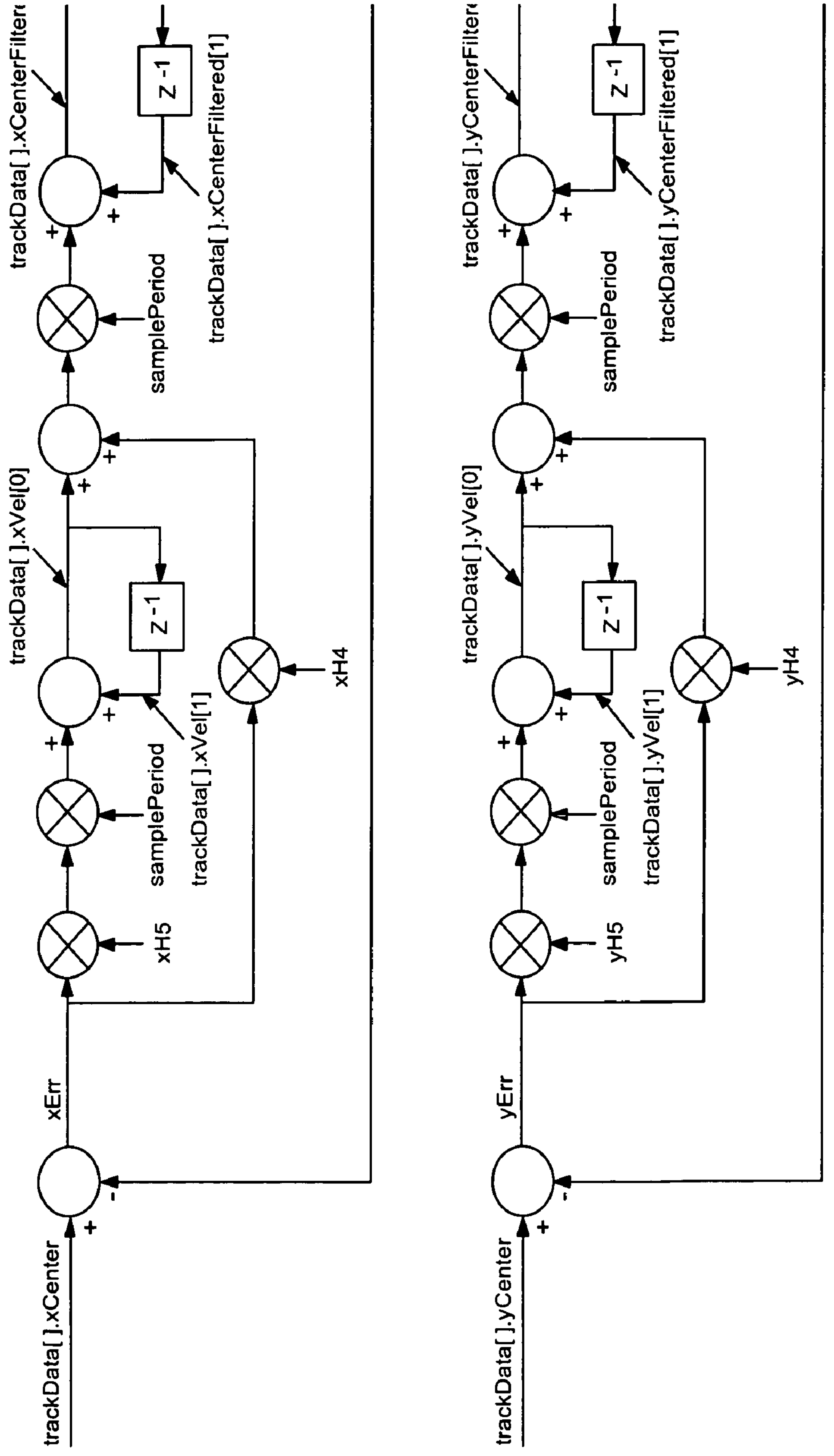
FIG. 11 is a data flow diagram illustrating one example of filtering position and velocity information in order to track an object.

FIG. 10 is an data flow diagram illustrating on example of a object tracker heuristic. At 816, the position and velocity information is filtered for both the x and y axis. FIG. 11 illustrates one example of how this can be accomplished. Returning to FIG. 10, the filtered position and velocity information analyzed at 818 to determine if a new detected large object is part of a tracked object. If the system 100 is not currently tracking data matching the object, a new object is created and tracked at 824. If the system 100 is currently tracking matching data, the tracked objected is updated at 820. If there is no new data with which to update the object, the system 100 updates the object data using previously stored information at 822. If the object previously existed, tracking information for the object is updated at 826. Both new and updated objects are cleaned with respect to tracking data at 828.

All output can be sent to an object classifier 506. As illustrated in the Figure, the object detector module 506 and any sensor data 108 can used to provide inputs to the process.

Some examples of functions and data items that can be used in the process flow are as follows:

CheckNewObjects( )

Determines if a new, detected large object is part of a tracked object.

```
{
    Perform the following for all detected objects in
    ObjectDetector.largeObjectData[object#] and all tracked objects in
    trackData[object#].
    {
        Exit to <track data match> (see FIG. 10) for any largeObjectData that satisfies
        the following:
        {
            ObjectDetector.largeObjectData[ ].xCenter
        AND ObjectDetector.largeObjectData[ ].yCenter
            are      within      objectAddDistMax[trackData[
    ].confidenceLevel][vehicleVelocity]
                of trackData[ ].xCenterFiltered[0] AND trackData[ ].yCenterFiltered[0]
                    AND closer than any other largeObjectData that satisfies the
    matching criteria;
}
```

Exit to <no track data match> (see FIG. 10) for any detected objects that do not match the criteria for being an update to a tracked object;

```
    }
    Perform the following for any tracked objects that are not updated with a new
    detected object:
    {
        Exit to <no input object> (see FIG. 10);
    }
}
```

CleanUpTrackData( )

Cleans up track data.

```
{
    Perform the following for all tracked objects:
    {
        if (trackData[#].missedUpdateCnt > missedUpdateCntMax)
            Delete object from trackData[#];
        if (trackData[#].confidenceLevel = 0)
            Delete object from trackData[#];
    }
    Reorganize remaining objects in trackData[#] so that the trackData[#] size is
    minimized;
}
```

CreateNewTrackedObject( )

Creates a new tracked object from a new detected, large object.

```
{
    Perform the following for each new object to be created:
    {
        trackData[#].angleCenter = the center of the added object angles that have
                    ObjectDetector.largeObjectData[#].range[angle] != 0;
        // Note: Bias the center towards the right when there is an even number of angles;
        trackData[#].confidenceLevel = 1;
        trackData[#].magn = ObjectDetector.largeObjectData[#].magn;
        trackData[#].missedUpdateCnt = 0;
        Perform the following for all angles:
        {
            trackData[#].range[angle] = ObjectDetector.largeObjectData[#].range[angle];
        }
        trackData[#].sampleTime[0] =
        Baseband.angleSampleTime[trackData[#].angleCenter];
        trackData[#].xCenter = ObjectDetector.largeObjectData[#].xCenter;
        trackData[#].xCenterFiltered[0] = ObjectDetector.largeObjectData[#].xCenter;
        trackData[#].xCenterFiltered[1] = ObjectDetector.largeObjectData[#].xCenter;
        trackData[#].xMax = ObjectDetector.largeObjectData[#].xMax;
        trackData[#].xMin = ObjectDetector.largeObjectData[#].xMin;
        trackData[#].xVel[0] = (velInitFactor/16) * VehicleInterface.vehicleVelocity;
        trackData[#].xVel[1] = (velInitFactor/16) * VehicleInterface.vehicleVelocity;
        trackData[#].yCenter = ObjectDetector.largeObjectData[#].yCenter;
        trackData[#].yCenterFiltered[0] = ObjectDetector.largeObjectData[#].yCenter;
        trackData[#].yCenterFiltered[1] = ObjectDetector.largeObjectData[#].yCenter;
        trackData[#].yLeft = ObjectDetector.largeObjectData[#].yLeft;
        trackData[#].yRight = ObjectDetector.largeObjectData[#].yRight;
        trackData[#].yVel[0] = 0;
        trackData[#].yVel[1] = 0;
        trackData[ ].distStraight
            = (trackData[ ].xCenterFiltered[0]^2 + trackData[
        ].yCenterFiltered[0]^2)^1/2;
        /* Note: distStraight = |(largest of xCenter & yCenter)| + 3/8 * |(smallest of
        xCenter & yCenter)| can be used as an approximation for better execution time. */
        trackData[ ].vel = (trackData[ ].xVel[0]^2 + trackData[ ].yVel[0]^2)^1/2;
        /***** Note: vel = |(largest of xVel & yVel)| + 3/8 * |(smallest of xVel & yVel)|
        can be used as an approximation for better execution time. *****/
        trackData[ ].movingClass = STATIONARY;
        trackData[ ].threatStatus = NO_THREAT;
        trackData[ ].typeClass = NON_VEHICLE;
    }
}
```

FilterPosAndVel( )

Filters the tracked object's X-axis position/velocity and Y-axis position/velocity.

```
{
    Perform the following for each tracked object:
    {
        samplePeriod = trackData[ ].sampleTime[0] − trackData[ ].sampleTime[1];
        Perform the processing shown in FIG. 11 Filter Pos and Vel Functions for X
        and Y directions;
    }
}
```

UpdateTrackData( )

```
{
    Perform the following for all tracked objects:
    {
        trackData[ ].distStraight
                = (trackData[ ].xCenterFiltered[0]^2 + trackData[
        ].yCenterFiltered[0]^2)^1/2;
        /* Note: distStraight = |(largest of xCenter & yCenter)| + 3/8 * |(smallest of
        xCenter & yCenter)| can be used as an approximation for better execution time. */
        trackData[ ].vel = (trackData[ ].xVel[0]^2 + trackData[ ].yVel[0]^2)^1/2;
        /***** Note: vel = |(largest of xVel & yVel)| + 3/8 * |(smallest of xVel & yVel)|
        can be used as an approximation for better execution time. *****/
        if (trackData[ ].xVel < 0)
            trackData[ ].vel = −trackData[ ].vel;
        xChange = trackData[#].xCenterFiltered[0] − trackData[#].xCenterFiltered[1];
        trackData[#].xMax = trackData[#].xMax + xChange;
        trackData[#].xMin = trackData[#].xMin + xChange;
        yChange = trackData[#].yCenterFiltered[0] − trackData[#].yCenterFiltered[1];
        trackData[#].yLeft = trackData[#].yLeft + yChange;
        trackData[#].yRight = trackData[#].yRight + yChange;
    }
}
```

UpdateTrackedObjectWithNewObject( )

Updates tracked object data with new detected, large object data.

```
{
    Perform the following for a tracked object that has a new object added:
    {
        trackData[#].angleCenter = the center of the added object angles that have
                    ObjectDetector.largeObjectData[#].range[angle] != 0;
        // Note: Bias the center towards the right when there is an even number of angles.
        increment trackData[#].confidenceLevel;
        trackData[#].magn = ObjectDetector.largeObjectData[#].magn;
        trackData[#].missedUpdateCnt = 0;
        Perform the following for all angles:
        {
            trackData[#].range[angle] = ObjectDetector.largeObjectData[#].range[angle];
        }
        trackData[#].sampleTime[1] = trackData[#].sampleTime[0];
        trackData[#].sampleTime[0]
        Baseband.angleSampleTime[trackData[#].angleCenter];
        trackData[#].xCenter = ObjectDetector.largeObjectData[#].xCenter;
        trackData[#].yCenter = ObjectDetector.largeObjectData[#].yCenter;
    }
}
```

UpdateTrackedObjectWithNoInput( )

Updates tracked object data when there is no new detected, large object data for it.

```
{
    Perform the following for each tracked object that does not have a new object
    added:
    {
        // Assume trackData[#].angleCenter did not change.
        decrement trackData[#].confidenceLevel;
        // Assume trackData[#].magn did not change.
        increment trackData[#].missedUpdateCnt;
        // Assume trackData[#].range[angle] did not change.
        trackData[#].sampleTime[1] = trackData[#].sampleTime[0];
        trackData[#].sampleTime[0] =
        Baseband.angleSampleTime[trackData[#].angleCenter];
        // Assume constant velocity in the same direction as last update.
        // e.g. Therefore same position that was predicted from last input sample.
            trackData[#].xCenter = trackData[#].xCenterFiltered[0];
            trackData[#].yCenter = trackData[#].yCenterFiltered[0];
    }
}
```

filterParams

Filter parameters for the X-axis and Y-axis position and velocity tracking filters (See FIG. 11). These numbers can be changed from the Operator Interface Control object.

```
    {
        xH4: Filter coefficient used for X-axis filtering.
            Default value = 5.35/seconds ± 5%.
        xH5: Filter coefficient used for X-axis filtering.
            Default value = 14.3/second^2 ± 5%.
        yH4: Filter coefficient used for Y-axis filtering.
            Default value = 2.8/seconds ± 5%.
```

-continued

```
        yH5: Filter coefficient used for Y-axis filtering.
            Default value = 4.0/second^2 ± 5%.
        xErrLimit: Limiting value for xErr in X-axis filtering.
            Default value = 5.0 meters.
        yErrLimit: Limiting value for yErr in Y-axis filtering.
            Default value = 5.0 meters.
    }
```

missedUpdateCntMax

Specifies the maximum number of updates a tracked object can have before it is deleted. This number can be changed from the Operator Interface Control object.

Default value=5.

objectAddDistMax[confidenceLevel][vehicleVelocity]

Specifies the maximum distance allowed between a newly detected large object and a tracked object before considering the newly detected large object an update to the tracked object. The distance is a function of trackData[#].confidenceLevel and vehicle 102 velocity as shown in Table B. The numbers in this table that are in Bold type can be changed from the Operator Interface Control object.

TABLE B objectAddDistMax[ ][ ] as a Function of confidenceLevel and vehicleVelocity

| TrackData.confidenceLevel | VehicleVelocity <=25 MPH | vehicleVelocity <25 & >50 MPH | vehicleVelocity >=50 MPH |
|---|---|---|---|
| 0 | Not Used | Not Used | Not Used |
| 1 | **5 meters** | **5 meters** | **7 meters** |
| 2 | **4 meters** | **4 meters** | **7 meters** |
| 3 | **3 meters** | **3 meters** | **7 meters** |
| 4 | **2 meters** | **2 meters** | **7 meters** |
| 5 | **2 meters** | **2 meters** | **7 meters** |
| **11** | **2 meters** | **2 meters** | **2 meters** |

Note:
vehicleVelocity is the vehicle speed and is a data item of the Vehicle Interface.Velocity Sensor.
Bold items in this table can be changed from the Operator Interface Control object.

objectAddDistMaxConfLevel

Specifies the last value of trackData.confidenceLevel to be use in determining objectAddDistMax[ ][ ] (see Table B) This number can be changed from the Operator Interface Control object.

Default value=11.

samplePeriod

The time between the last two sets of RADAR baseband receive samples for the current object being processed.

trackData[object #]

Provides the information that is maintained for each tracked object.

```
{
  angleCenter: Estimated center angle of the object.
  confidenceLevel: Indicates the net number of sample times this object
  has been tracked.
  distStraight: Straight line distance from the host vehicle to the center
  of the tracked object.
  distVehPath: Vehicle path distance from the host vehicle to the center
  of the tracked object.
  headOnIndications: Indicates the number of consecutive times that a
  head on scenario has been detected for this object.
  magn: Maximum FFT magnitude of any range bin the object consists of.
  missedUpdateCount: Indicates the number of consecutive times that
  the object has not been updated with a new detected object.
  movingClass: Classifies an object based on it's movement.
    Possible values are:
      STATIONARY: Object is not moving relative to the ground.
      OVERTAKING: Object is being overtaken by the host vehicle.
      RECEDING: Object is moving away from the host vehicle,
      APPROACHING: Object is approaching host vehicle from the
      opposite direction.
      FOLLOWING: Object is moving at approximately the same
      velocity as the host vehicle.
  range[angle #]: Specifies the closest range bin in a given angle that
  has an FFT magnitude that crossed the large threshold in that angle.
  Set equal to zero for angles when none of the range bins crossed the
  large threshold.
  sampleTime[sample#]: Last two times that radar baseband receive
  samples were taken for this object.
    sample# = 0 is the time the latest samples were taken.
    sample# = 1 is the time the next to the latest samples were taken.
  threatStatus: Indicates the latest threat status of the tracked object.
  Possible values are:
    HIGHEST_THREAT: Tracked object is the highest threat for
    a warning.
    NO_THREAT: Tracked object is currently not a possible threat
    for a warning.
    POSSIBLE_THREAT: Tracked object is a possible threat
    for a warning.
  typeClass: Classifies an object based on whether it has been identified
  as a vehicle or not.
      Possible values: NON_VEHICLE, VEHICLE.
  vel: Magnitude of the relative velocity between the host vehicle and a
  tracked object. Note: A positive value indicates the tracked object is
  moving away from the host vehicle.
  xCenter: Center X axis position of the large, detected object that was
  last used to update the position of the tracked object.
  xCenterFiltered[#]: Last two filtered, estimated center X axis
  positions of the object.
    # = 0 is latest estimated position. This is the predicted
    position of the next sample based on the last input sample (xCenter).
    # = 1 is next to latest estimated position.
  xMax: The maximum X axis position of the object.
  xMin: The minimum X axis position of the object.
  xVel[#]: Last two filtered velocity estimates in the X axis direction
  of the object.
  Note: A positive value indicates the tracked object is moving away
  from the host vehicle.
    # = 0 is latest estimated velocity.
    # = 1 is next to latest estimated velocity.
  yCenter: Center Y axis position of the large, detected object that was
  last used to update the position of the tracked object.
  yCenterFiltered[#]: Last two filtered, estimated center Y axis
  positions of the object.
    # = 0 is latest estimated position. This is the predicted position
    of the next sample based on the last input sample (yCenter).
    # = 1 is next to latest estimated position.
  yLeft: The left most Y axis position of the object.
  yRight: The right most Y axis position of the object.
  yVel[#]: Last two filtered velocity estimates in the Y axis direction
  of the object.
  Note: A positive value indicates the tracked object is moving from
  left to right.
    # = 0 is latest estimated velocity.
    # = 1 is next to latest estimated velocity.
}
```

velInitFactor

Specifies the factor used in initializing the x velocity of a newly created object. The x velocity is initialized to (velInitFactor/16) * VehicleInterface.vehicleVelocity. This number can be changed from the Operator Interface Control object.

Default value=16.

D. Vehicle Prediction and Scene Evaluation Heuristics

Figure 12:
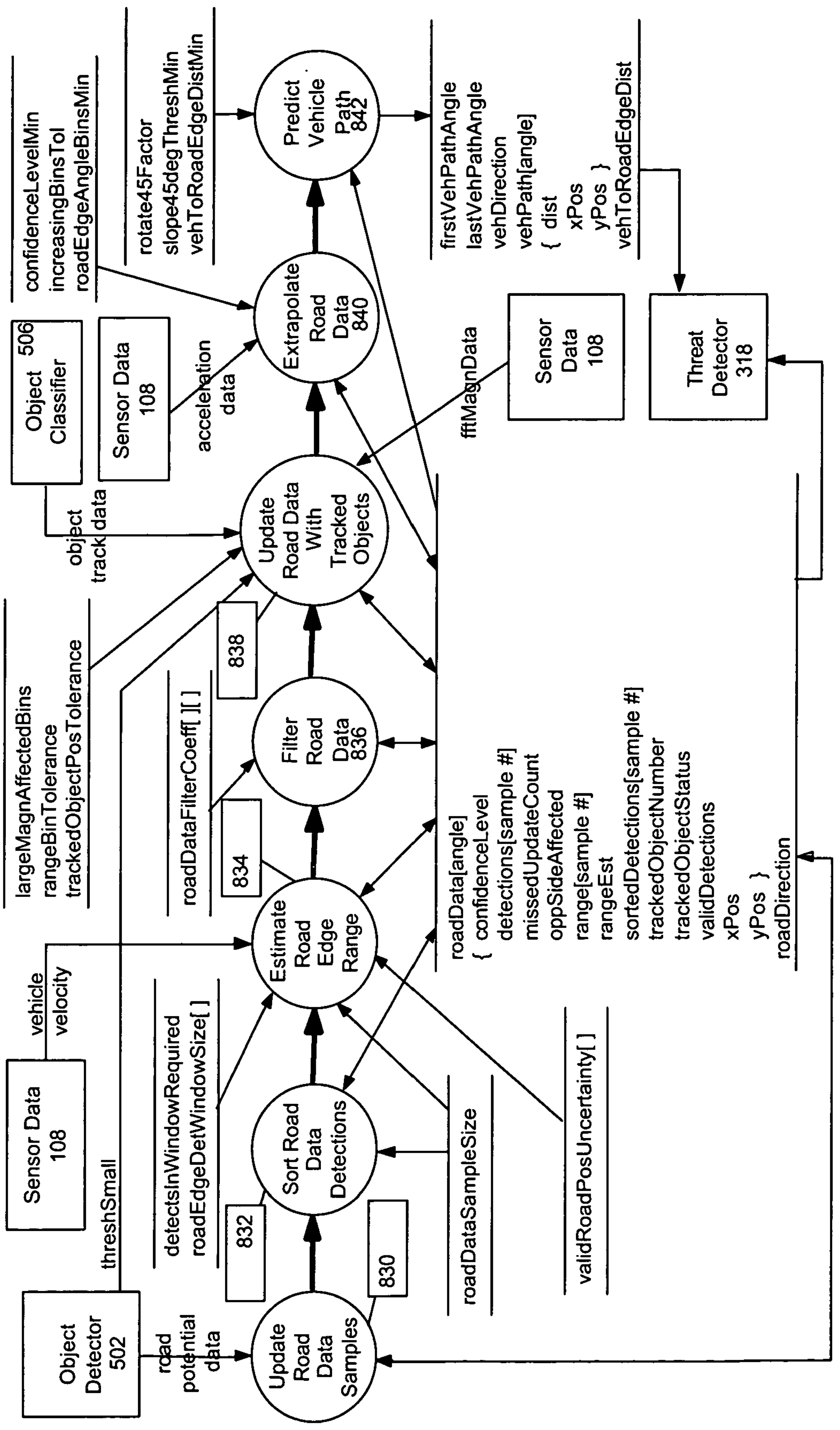
FIG. 12 is a data flow diagram illustrating one example of a vehicle predictor and scene detector heuristic that can be incorporated into the invention.

FIG. 12 is a data flow diagram illustrating on example of a vehicle prediction/scene evaluation heuristic. At 830, road data samples from the object detector 502 are updated. At 832, all road data detections are sorted in increasing range order. At 834, the range to the road edge in each angle bin is estimated based on the updated and sorted data from 830 and 832. All road data is then filtered at 836. At 838, road data is updated with tracked objects data. Road data is then extrapolated at 840, so that a vehicle path can be predicted at 842.

Some examples of functions and data items that can be used in the process flow are as follows:

EstimateRoadEdgeRange( )

Estimates the range to the road edge in each angle bin based on the last roadDataSampleSize samples of road data.

{

Determine rangeWindowSize based on roadEdgeDetWindowSize[ ] specified in Table E Find the range to the road edge for each angle using roadData[angle].sortedDetections[sample#] based on the following:

{

Find the number of detections in an angle/range bin window that includes the number of range bins specified by rangeWindowSize (for each angle) and starts from the lowest range of roadData[angle].sortedDetections[sample#];

Continue repeating the above process starting each time with the next highest range of roadData[angle].sortedDetections[sample#] until the sliding window covers the range bin specified by ObjectDetector.rangeBinMax;

Find the angle/range bin window with the most detections and store the lowest range detection of that window as the latestDetectedRangeTemp;

Determine the valid road position uncertainty of new road data based on the vehicle velocity as shown in Table C;

TABLE C

Valid Position Uncertainty of New Road Data

| Vehicle Velocity | ValidRoadPosUncertainty |
|---|---|
| <10 meters/second (22.3 MPH) | 10 range bins |
| >=10 & <20 meters/second (44.7 MPH) | 20 range bins |
| >=20 | 40 range bins |

Note:
vehicle velocity comes from the VehicleInterface.VelocitySensor.

Perform the following based on the number of detections found in the angle/range bin window with the most detections:

```
{
    CASE: number of detections >= detectsInWindowRequired
{
    Add latestDetectedRangeTemp as the latest sample in
    roadData[angle].range[sample#] while keeping the previous 4 samples where
    angle corresponds to the angle/bin pair shown in Table E;
    if (latestDetectedRangeTemp is within
                                roadData[angle].rangeEst            ±
    validRoadPosUncertainty)
    {
        Increment roadData[angle].confidenceLevel;
        if (roadData[angle].confidenceLevel < confidenceLevelMin)
            roadData[angle].confidenceLevel = confidenceLevelMin;
        roadData[angle].missedUpdateCount = 0;
    }
    else // Fails validRoadPosUncertainty test.
    {
        roadData[angle].confidenceLevel = confidenceLevelMin;
    }
}
CASE: number of detections < detectsInWindowRequired and > 0
{
    if (latestDetectedRangeTemp is within
                                roadData[angle].rangeEst            ±
    validRoadPosUncertainty)
    {
        Add latestDetectedRangeTemp as the latest sample in
        roadData[angle].range[sample#] while keeping the previous 4 samples where
        angle corresponds to the angle/bin pair shown in Table E;
        Increment roadData[angle].confidenceLevel;
        if (roadData[angle].confidenceLevel < confidenceLevelMin)
            roadData[angle].confidenceLevel = confidenceLevelMin;
        roadData[angle].missedUpdateCount = 0;
    }
    else // Fails validRoadPosUncertainty test and detectsInWindowRequired test.
    {
        Add the last sample of roadData[angle].range[sample#] as the latest sample
        in
        roadData[angle].range[sample#] while keeping the previous 4 samples where
        angle corresponds to the angle/bin pair shown in Table E;
        Decrement roadData[angle].confidenceLevel;
        Increment roadData[angle].missedUpdateCount;
        }
    }
    CASE: number of detections = 0
    {
        roadData[angle].confidenceLevel = 0;
        roadData[angle].validDetections = 0;
    }
  }
}
}
```

ExtrapolateRoadData( )

Fills in missing road edge data points.

```
{
    Perform the following for angles 0 through 19 of roadData[angle]:
    {
        if (roadData[angle]. trackedObjectStatus = NONE)
            roadData[19 − angle].oppSideAffected = FALSE;
        else
            roadData[19 − angle].oppSideAffected = TRUE;
    }
    Determine the following for angles of roadData[angle] that have a
    confidenceLevel >= confidenceLevelMin AND oppSideAffected =
    FALSE:
    {
```

-continued

```
        totalAngleBins = total angle bins that have
        roadData[angle].confidenceLevel >= confidenceLevelMin and
        roadData[angle].oppSideAffected = FALSE;
        leftToRightIncreasingBins = the number of times the
        roadData[ ].rangeEst increases when going from angle 0 to 19
        (left to right);
        rightToLeftIncreasingBins = the number of times the
        roadData[ ].rangeEst increases when going from angle 19 to 0
        (right to left);
    }
```

if (totalAngleBins>roadEdgeAngleBinsMin)

{

Set roadDirection data item based on Table D;

TABLE D

Road Direction Logic

| Condition | roadDirection Result |
|---|---|
| accelerometerDirection = LEFT_TO_RIGHT | LEFT_TO_RIGHT |
| accelerometerDirection = RIGHT_TO_LEFT | RIGHT_TO_LEFT |
| accelerometerDirection = STRAIGHT, leftToRightIncreasingBins > (rightToLeftIncreasingBins + increasingBinsTol) | LEFT_TO_RIGHT |
| accelerometerDirection = STRAIGHT, rightToLeftIncreasingBins > (leftToRightIncreasingBins + increasingBinsTol) | RIGHT_TO_LEFT |
| None of the above conditions is met | STRAIGHT |

Note:
Data item accelerometerDirection is from the "Accelerometer".

```
}
else
  Set roadDirection data item to NON_DETERMINED;
Perform the following based on roadDirection:
{
  CASE: roadDirection = LEFT_TO_RIGHT
  {
    Perform the following going from angle 0 to angle 19 (left to right) for angles
    that have a roadData[angle].confidenceLevel >= confidenceLevelMin (e.g.
    valid rangeEst angles):
    {
      Modify roadData[angle].rangeEst of any angle that is decreasing in range so
      that rangeEst is equal to the preceding valid angle's rangeEst;
      Calculate and store roadData[angle].xPos and yPos for any angles that are
      modified;
    }
    Perform the following going from angle 0 to angle 19 (left to right) for angles
    that do not have a roadData[angle].confidenceLevel >= confidenceLevelMin
    (e.g. invalid rangeEst angles):
    {
      Calculate and store roadData[angle].xPos and yPos so that a straight line is
      formed between valid rangeEst angles;
    }
  }
  CASE: roadDirection = RIGHT_TO_LEFT
  {
    Perform the following going from angle 19 to angle 0 (right to left) for angles
    that have a roadData[angle].confidenceLevel >= confidenceLevelMin (e.g.
    valid rangeEst angles):
    {
      Modify roadData[angle].rangeEst of any angle that is decreasing in range so
      that rangeEst is equal to the preceding valid angle's rangeEst;
      Calculate and store roadData[angle].xPos and yPos for any angles that are
      modified;
    }
    Perform the following going from angle 19 to angle 0 (right to left) for angles
    that do not have a roadData[angle].confidenceLevel >= confidenceLevelMin
    (e.g. invalid rangeEst angles):
    {
      Calculate and store roadData[angle].xPos and yPos so that a straight line is
      formed between valid rangeEst angles;
    }
  }
  CASE: roadDirection = STRAIGHT
  {
    Perform the following going from angle 0 to angle 9 for angles that have a
    roadData[angle].confidenceLevel >= confidenceLevelMin (e.g. valid rangeEst
    angles):
    {
      Set roadData[angle].confidenceLevel = 0 for any angle that is decreasing in
      range;
    }
    Perform the following going from angle 0 to angle 9 for angles that do not have
    a roadData[angle].confidenceLevel >= confidenceLevelMin (e.g. invalid
    rangeEst angles):
    {
      Calculate and store roadData[angle].xPos and yPos so that a straight line is
```

-continued

```
      formed between valid rangeEst angles (confidenceLevel >=
      confidenceLevelMin);
   }
   Perform the following going from angle 19 to angle 10 for angles that have a
   roadData[angle].confidenceLevel >= confidenceLevelMin (e.g. valid rangeEst
   angles):
   {
      Set roadData[angle].confidenceLevel = 0 for any angle that is decreasing in
      range;
   }
   Perform the following going from angle 19 to angle 10 for angles that do not
   have a roadData[angle].confidenceLevel >= confidenceLevelMin (e.g. invalid
   rangeEst angles):
   {
      Calculate and store roadData[angle].xPos and yPos so that a straight line is
      formed between valid rangeEst angles (confidenceLevel >=
      confidenceLevelMin);
   }
  }
 }
}
```

FilterRoadData( )

Filters the road data.

```
{
   Perform the following for angles that have roadData[angle].missedUpdateCount =
   0 based on roadData[angle].validDetections:
   {
      validDetections = 1:
      {
         roadData[angle].rangeEst = roadData[angle].range[n]; // n = latest sample.
         // Note: Differences in resolution must be taken into account.
      }
      validDetections = 2:
      {
         y_n = x_n * h[2][0] + x_n-1 * h[2][1];
         where:
            y_n = roadData[angle].rangeEst,
            x_n = roadData[angle].range[n], // n = latest sample, n-1 = next to latest
            sample . . .
            h[i][j] = roadDataFilterCoeff[i][j] // i = confidenceLevel; j = 0 or 1.
            // Note: Differences in resolution must be taken into account.
            /
      }
      validDetections = 3:
      {
         y_n = x_n * h[3][0] + x_n-1 * h[3][1] + x_n-2 * h[3][2];
         where:
            y_n = roadData[angle].rangeEst,
            x_n = roadData[angle].range[n], // n = latest sample, n-1 = next to latest
            sample . . .
            h[i][j] = roadDataFilterCoeff[i][j] // i = confidenceLevel; j = 0, 1, or 2.
            // Note:
      }
      validDetections = 4:
      {
         y_n = x_n * h[4][0] + x_n-1 * h[4][1] + x_n-2 * h[4][2] + x_n-3 * h[4][3];
         where:
            y_n = roadData[angle].rangeEst,
            x_n = roadData[angle].range[n], // n = latest sample, n-1 = next to latest
            sample . . .
            h[i][j] = roadDataFilterCoeff[i][j] // i = confidenceLevel; j = 0, 1, 2, or 3.
            // Note: Differences in resolution must be taken into account.
      }
      validDetections >= 5:
      {
         y_n = x_n * h[5][0] + x_n-1 * h[5][1] + x_n-2 * h[5][2] + x_n-3 * h[5][3] + x_n-4 * h[5][4];
         where:
            y_n = roadData[angle].rangeEst,
            x_n = roadData[angle].range[n], // n = latest sample, n-1 = next to latest
            sample . . .
```

-continued

```
                h[i][j] = roadDataFilterCoeff[i][j] // i = confidenceLevel limited to 5; j = 0, 1,
                2, 3, or 4.
                // Note: Differences in resolution must be taken into account.
            }
        }
        Perform the following for the angles of roadData[angle]: /* Note: The following
        does not have to be performed for angles with roadData[angle].confidenceLevel =
        0. */
        {
            roadData[angle].xPos = Equivalent X axis position of roadData[angle].rangeEst;
            roadData[angle].yPos = Equivalent Y axis position of roadData[angle].rangeEst;
    }
}
```

PredictVehiclePath ( )

Predicts the most likely path of the host vehicle.

```
{
    firstVehPathAngleLeftToRight = first angle with roadData[angle].confidenceLevel
    >= confidenceLevelMin when going from angle 0 to angle 19 (left to right);
    firstVehPathAngleRightToLeft = first angle with roadData[angle].confidenceLevel
    >= confidenceLevelMin when going from angle 19 to angle 0 (right to left);
    Perform the following based on roadDirection:
    {
        roadDirection = LEFT_TO_RIGHT:
        {
            firstVehPathAngle = firstVehPathAngleLeftToRight;
            lastVehPathAngle = firstVehPathAngleRightToLeft;
            vehToRoadEdgeDist
                    = maximum of (- roadData[firstVehPathAngle].yPos) and
            vehToRoadEdgeDistMin;
        Find vehPath[angle] for the first vehicle path angle (firstVehPathAngle):
        {
            vehPath[angle].yPos = roadData[angle].yPos + vehToRoadEdgeDist;
            vehPath[angle].xPos = roadData[angle].xPos;
        }
        Perform the following for each angle going from the firstVehPathAngle + 1 to
        lastVehPathAngle:
        {
            deltaX = roadData[angle].xPos - roadData[angle - 1].xPos;
            deltaY = roadData[angle].yPos - roadData[angle - 1].yPos;
            if (deltaY <= deltaX)
            {
                slope = deltaY / deltaX;
                if (slope < slope45degThreshMin)
                {
                    vehPath[angle].yPos = roadData[angle].yPos + vehToRoadEdgeDist;
                    vehPath[angle].xPos = roadData[angle].xPos;
                }
                else // slope >= slope45degThreshMin.
                {
                    vehPath[angle].yPos = roadData[angle].yPos
                            + rotate45Factor *
                    vehToRoadEdgeDist;
                    vehPath[angle].xPos = roadData[angle].xPos
                            -rotate45Factor*vehToRoadEdgeDist;
                }
            }
            else // deltaY > deltaX.
            {
                slope = deltaX / deltaY;
                if (slope < slope45degThreshMin)
                {
                    vehPath[angle].yPos = roadData[angle].yPos;
                    vehPath[angle].xPos = roadData[angle].xPos - vehToRoadEdgeDist;
                }
                else // slope >= slope45degThreshMin.
                {
                    vehPath[angle].yPos = roadData[angle].yPos
                            + rotate45Factor *
                    vehToRoadEdgeDist;
                    vehPath[angle].xPos = roadData[angle].xPos
```

-continued

```
                                    −       rotate45Factor              *
                vehToRoadEdgeDist;
                }
            }
        }
        vehPath[firstVehPathAngle].dist
                        =    (vehPath[firstVehPathAngle].xPos^2           +
        vehPath[firstVehPathAngle].yPos^2)^1/2;
        /* Note: dist = |(largest of xPos & yPos)| + 3/8 * |(smallest of xPos & yPos)| can
        be used as an approximation for better execution time. */
        Find vehPath[angle].dist for each successive angle starting with
        firstVehPathAngle + 1 and ending with lastVehPathAngle based on the
        following:
        {
            xDelta = vehPath[angle].xPos − vehPath[angle−1].xPos;
            yDelta = vehPath[angle].yPos − vehPath[angle−1].yPos;
            vehPath[angle].dist = vehPath[angle−1].dist + (xDelta^2 + yDelta^2)^1/2;
            /* Note: dist = |(largest of xDelta & yDelta)| + 3/8 * |(smallest of xDelta &
            yDelta)| can be used as an approximation for better execution time. */
        }
        vehDirection = LEFT_TO_RIGHT;
    }
    roadDirection = RIGHT_TO_LEFT:
    {
        firstVehPathAngle = firstVehPathAngleRightToLeft;
        lastVehPathAngle = firstVehPathAngleLeftToRight;
        vehToRoadEdgeDist
                    =    maximum of roadData[firstVehPathAngle].yPos       and
        vehToRoadEdgeDistMin;
        Find vehPath[angle] for the first vehicle path angle (firstVehPathAngle):
        {
            vehPath[angle].yPos = roadData[angle].yPos − vehToRoadEdgeDist;
            vehPath[angle].xPos = roadData[angle].xPos;
        }
        Perform the following for each angle going from the firstVehPathAngle + 1 to
        lastVehPathAngle:
        {
            deltaX = roadData[angle].xPos − roadData[angle − 1].xPos;
            deltaY = ABS(roadData[angle].yPos − roadData[angle − 1].yPos);
            // ABS means take absolute value of.
            if (deltaY <= deltaX)
            {
                slope = deltaY / deltaX;
                if (slope < slope45degThreshMin)
                {
                    vehPath[angle].yPos = roadData[angle].yPos − vehToRoadEdgeDist;
                    vehPath[angle].xPos = roadData[angle].xPos;
                }
                else // slope >= slope45degThreshMin.
                {
                    vehPath[angle].yPos = roadData[angle].yPos
                                − rotate45Factor * vehToRoadEdgeDist;
                    vehPath[angle].xPos = roadData[angle].xPos
                                − rotate45Factor * vehToRoadEdgeDist;
                }
            }
            else // deltaY > deltaX.
            {
                slope = deltaX / deltaY;
                if (slope < slope45degThreshMin)
                {
                    vehPath[angle].yPos = roadData[angle].yPos;
                    vehPath[angle].xPos = roadData[angle].xPos − vehToRoadEdgeDist;
            }
            else // slope >= slope45degThreshMin.
            {
                vehPath[angle].yPos = roadData[angle].yPos
                                − rotate45Factor * vehToRoadEdgeDist;
                vehPath[angle].xPos = roadData[angle].xPos
                                − rotate45Factor * vehToRoadEdgeDist;
            }
        }
    }
    vehPath[firstVehPathAngle].dist
                    =       (vehPath[firstVehPathAngle].xPos^2             +
    vehPath[firstVehPathAngle].yPos^2)^1/2;
    /* Note: dist = |(largest of xPos & yPos)| + 3/8 * |(smallest of xPos & yPos)| can
    be used as an approximation for better execution time. */
    Find vehPath[angle].dist for each successive angle starting with
```

-continued

```
      firstVehPathAngle + 1 and ending with lastVehPathAngle based on the
      following:
      {
            xDelta = vehPath[angle].xPos − vehPath[angle+1].xPos;
            yDelta = vehPath[angle].yPos − vehPath[angle+1].yPos;
            vehPath[angle].dist = vehPath[angle+1].dist + (xDelta^2 + yDelta^2)^(1/2);
            /* Note: dist = |(largest of xDelta & yDelta)| + 3/8 * |(smallest of xDelta &
            yDelta)| can be used as an approximation for better execution time. */
      }
      vehDirection = RIGHT_TO_LEFT;
}
roadDirection = STRAIGHT:
{
      // Note: lastVehPathAngle is not needed for a straight road.
      if ((− roadData[firstVehPathAngleLeftToRight].yPos)
                        < roadData[firstVehPathAngleRightToLeft].yPos)
      {
            firstVehPathAngle = firstVehPathAngleLeftToRight;
            vehToRoadEdgeDist = maximum of (− roadData[firstVehPathAngle].yPos)
                                          and vehToRoadEdgeDistMin;
            vehDirection = STRAIGHT_ON_LEFT_EDGE;
      }
      else
      {
            firstVehPathAngle = firstVehPathAngleRightToLeft;
            vehToRoadEdgeDist = maximum of roadData[firstVehPathAngle].yPos
                                          and vehToRoadEdgeDistMin;
            vehDirection = STRAIGHT_ON_RIGHT_EDGE;
      }
      if (vehDirection = STRAIGHT_ON_LEFT_EDGE)
      {
            Perform the following for each angle going from the firstVehPathAngle to
            angle 9:
            {
                  vehPath[angle].yPos = roadData[angle].yPos + vehToRoadEdgeDist;
                  vehPath[angle].xPos = roadData[angle].xPos;
                  vehPath[angle].dist = (vehPath[angle].xPos^2 + vehPath[angle].yPos^2)^(1/2);
                  /* Note: dist = |(largest of xPos & yPos)| + 3/8 * |(smallest of xPos & yPos)|
                  can be used as an approximation for better execution time. */
            }
      }
      else // vehDirection = STRAIGHT_ON_RIGHT_EDGE.
      {
            Perform the following for each angle going from the firstVehPathAngle to
            angle 10:
            {
                  vehPath[angle].yPos = roadData[angle].yPos − vehToRoadEdgeDist;
                  vehPath[angle].xPos = roadData[angle].xPos;
                  vehPath[angle].dist = (vehPath[angle].xPos^2 + vehPath[angle].yPos^2)^(1/2);
                  /* Note: dist = |(largest of xPos & yPos)| + 3/8 * |(smallest of xPos & yPos)|
                  can be used as an approximation for better execution time. */
              }
            }
      }
      roadDirection = NON_DETERMINED:
      {
            vehDirection = NON_DETERMINED;
      }
   }
}
```

SortRoadDataDetections( )

Sorts roadData[angle].detections[sample#] in increasing range order.

```
{
   Perform the following for each angle:
   {
      Combine the roadData[angle].detections[sample#] from the following
      angle pairs: 0–1, 1–2, 2–3, 3–4, 4–5, 5–6, 6–7, 7–8, 8–9, 9–10,
      10–11, 11–12, 12–13, 13–14, 14–15, 15–16, 16–17, 17–18,
      18–19 and associate these combined detections with
```

-continued

```
      angles as shown in Table E;
      Store the first roadDataSampleSize samples of the combined
      detections found above in
      roadData[angle].sortedDetections[sample#];
      Increment roadData[angle].validDetections for angles that
      have at least one detection;
      Sort the first roadDataSampleSize samples of
      roadData[angle].sortedDetections[sample#] in increasing range order;
   }
```

TABLE E

Angle Bin correspondence with Angle Pair

| Angle | Angle Pair |
|---|---|
| 0 | 0–1 |
| 1 | 0–1 |
| 2 | 1–2 |
| 3 | 2–3 |
| 4 | 3–4 |
| 5 | 4–5 |
| 6 | 5–6 |
| 7 | 6–7 |
| 8 | 7–8 |
| 9 | 8–9 |
| 10 | 9–10 |
| 11 | 10–11 |
| 12 | 11–12 |
| 13 | 12–13 |
| 14 | 13–14 |
| 15 | 14–15 |
| 16 | 15–16 |
| 17 | 16–17 |
| 18 | 17–18 |
| 19 | 18–19 |

Note: The above table provides more resolution on the right edge because typically there are more road edge points on the right side of the road.

}

UpdateRoadDataSamples( )

Updates the roadData data item based on new data (roadPotentialData) from the Object Detector.

```
{
  Perform the following for each angle of the
  ObjectDetector.roadPotentialData[angle] data item based
  on crossingFound:
  {
    crossingFound = TRUE:
    {
      Add ObjectDetector.roadPotentialData[angle].range as the latest
      sample in roadData[angle].detections[sample#] while keeping
      the previous 19 samples;
    }
    crossingFound = FALSE:
    {
      Add ObjectDetetctor.rangeBinMax as the latest sample in
      roadData[angle].detections[sample#] while keeping the
      previous 19 samples;
    }
  }
}
```

UpdateRoadDataWithTrackedObjects( )

Updates roadData data item based on tracked object data.

```
{
  // Eliminate road edge data in the same angles as vehicles.
  Perform the following for all angles of tracked objects with
  ObjectTracker.trackData[#].typeClass = VEHICLE:
  {
    if (ObjectTracker.trackData[#].range[angle] is between
    left edge and right edge of road)
      roadData[angle].confidenceLevel = 0;
    // The following keeps from putting the road edge on the left
    edges of tracked objects.
    Find the angle closest to the left edge (angle 0) that has
                                 ObjectTracker.trackData[#].range[angle] !=
    0;
    Perform the following for each angle starting from the angle
    found above and going towards the left edge (angle 0):
```

-continued

```
  {
    Perform the following covering range bins
    ObjectTracker.trackData[#].range[angle] ± rangeBinTolerance:
    {
      if (Baseband.fftMagnData[angle][bin] >
      ObjectDetector.threshSmall for any of the covered range bins)
        roadData[angle].confidenceLevel = 0;
    }
  }
  // The following keeps from putting the road edge on the right
  edges of tracked objects.
  Find the angle closest to the right edge (angle 19) that has
  ObjectTracker.trackData[#].range[angle] != 0;
  Perform the following for each angle starting from the angle
  found above and going towards the right edge (angle 19):
  {
    Perform the following covering range bins
    ObjectTracker.trackData[#].range[angle] ± rangeBinTolerance:
    {
      if (Baseband.fftMagnData[angle][bin] >
      ObjectDetector.threshSmall for any of the covered range bins)
        roadData[angle].confidenceLevel = 0;
    }
  }
}
Find roadData[angle] that is part of a tracked object by checking
if all of the following are true:
{
  roadData[ ].xPos
        >=    ObjectTracker.trackData[ ].xMin    −
  trackedObjectPosTolerance.xMin;
  roadData[ ].xPos
        <=    ObjectTracker.trackData [ ].xMax    +
  trackedObjectPosTolerance.xMax;
  roadData[ ].yPos
        >=    ObjectTracker.trackData [ ].yLeft    −
  trackedObjectPosTolerance.yLeft;
  roadData[ ].yPos
        <=    ObjectTracker.trackData [ ].yRight    +
  trackedObjectPosTolerance.yRight;
  Note: ObjectTracker.trackData needs to be updated data
  based on the same samples that the roadData came from before the
  above calculations are performed.
}
// Eliminate road edge data that is part of non-stationary tracked objects.
Perform the following for angles of roadData[angle] that meet
the following criteria:
  1) Part of a tracked object (found above),
  2) ObjectTracker.trackData[object#].range[angle] !=0,
  3) ObjectTracker.trackData[object#].movingClass != STATIONARY:
{
  roadData[angle].confidenceLevel = 0;
  roadData[angle].trackedObjectNumber = index number
  of tracked object;
  roadData[angle].trackedObjectStatus = MOVING;
}
// Eliminate road edge data that is amplitude affected by tracked objects.
Perform the following for the angles of roadData[angle]
that are not part of a tracked object but have a tracked
object in the roadData angle that meets the
following criteria:
  1. ObjectTracker.trackData[any object #].range[angle] −
  largeMagnAffectedBins) <=
  roadData[angle].rangeEst),
      // Note: Differences in resolution must be taken into account.
  2. ObjectTracker.trackData[any object #].range[angle] != 0,
  3. ObjectTracker.trackData[any object #].typeClass = VEHICLE.
{
  roadData[angle].confidenceLevel = 0;
  roadData[angle].trackedObjectNumber = index number
  of tracked object;
  roadData[angle].trackedObjectStatus = AMPLITUDE_AFFECTED;
}
// Use non−vehicle tracked objects as road edge data.
Perform the following for angles of tracked objects that meet
the following criteria:
  1) ObjectTracker.trackData[object#].range[angle] != 0,
  2) ObjectTracker.trackData[object#].missedUpdateCount = 0,
  3) ObjectTracker.trackData[object#].typeClass = NON_VEHICLE,
```

-continued

```
4) The closest tracked object in range for angles that have
   multiple tracked objects:
{
   roadData[angle].confidenceLevel = confidenceLevelMin;
   roadData[angle].rangeEst =
   ObjectTracker.trackData[object#].range[angle];
   roadData[angle].range[0] =
   ObjectTracker.trackData[object#].range[angle];
   roadData[angle].missedUpdateCount = 0;
 }
}
```

confidenceLevelMin:

Specifies the minimum confidenceLevel before roadData [angle].rangeEst is used to determine the road edge. This number can be changed from the Operator Interface Control object.

Default value=5.

detectsInWindowRequired

Specifies the number of detections that are required in an angle/range bin detection window to have valid road data. This number can be changed from the Operator Interface Control object.

Default value=5.

firstVehPathAngle:

Identifies the first angle that contains vehicle path data. Note: Use of this data item is dependent on the vehDirection.

firstVehPathAngleLeftToRight:

Identifies the first angle that contains vehicle path data when going from angle 0 to angle 19 (left to right).

firstVehPathAngleRightToLeft:

Identifies the first angle that contains vehicle path data when going from angle 19 to angle 0 (right to left).

increasingBinsTol:

Specifies tolerance used in determining the road direction (see Table D). This number can be changed from the Operator Interface Control object.

Default value=2.

largeMagnAffectedBins

Specifies the number of FFT bins closer in range that are affected by an amplitude that crossed the large threshold. This number can be changed from the Operator Interface Control object.

Default value=100.

lastVehPathAngle

Identifies the last angle that contains vehicle path data. Note: Use of this data item is dependent on the vehDirection.

rangeBinTolerance

Specifies the range bin tolerance to use when looking for small threshold crossings in the UpdateRoadDataWithTrackedObject( ) function. This number can be changed from the Operator Interface Control object.

Default value=2.

roadData[angle]

Indicates where the roadway is estimated to be located and data used in the estimation.

{ confidenceLevel: Indicates the consecutive times that roadPotentialData[angle] from the Object Detector has been valid and not affected by tracked objects.

detections[sample #]: The last 20 range samples from the Object Detector's roadPotentialData[angle].range data item.

Resolution=½ meter.

missedUpdateCount: Indicates the number of consecutive times that the road data has not been updated.

oppSideAffected: Indicates that the angle (19—angle #) is being affected by a tracked object.

range[sample #]: The last 5 range estimates from the EstimateRoadEdgeRange function.

Resolution=½ meter.

rangeEst: The last estimated range of the road edge in a given angle after the FilterRoadData function.

Minimum resolution=⅛ meter.

sortedDetections: roadData[angle].detections[sample #] sorted in increasing range order (e.g. sample 0 indicates the closest range with a detection).

trackedObjectNumber: Index number to access ObjectTracker.trackData[object #] of the object affecting the estimation of the road edge.

trackedObjectStatus: Indicates if a tracked object is either affecting estimation of the road edge or is a part of the road edge.

Possible values:

- AMPLITUDE_AFFECTED: Indicates road edge estimate for this angle has been affected by a large FFT amplitude.
- MOVING: Indicates the road edge estimate for this angle has been affected by a moving, tracked object.
- NON_MOVING: Indicates the road edge estimate for this angle has been affected by a non-moving, tracked object that has not moved since being tracked.
- NONE: No tracked object affect on estimating the road edge in this angle.
- STATIONARY_VEHICLE: Indicates the road edge estimate for this angle has been affected by a stationary, tracked object that has previously moved since being tracked.

validDetections: Indicates the number of valid detections in roadData[angle].sortedDetections.

xPos: The last estimated X axis position of the road edge for a given angle.

yPos: The last estimated Y axis position of the road edge for a given angle.

} roadDataFilterCoeff[ ]

Specifies coefficients used in filtering road data. These numbers can be changed from the Operator Interface Control object.

```
{
   roadDataFilterCoeff[2][0] = 47/64,
   roadDataFilterCoeff[2][1] = 17/64,
   roadDataFilterCoeff[3][0] = 42/64,
   roadDataFilterCoeff[3][1] = 16/64,
   roadDataFilterCoeff[3][2] = 6/64,
   roadDataFilterCoeff[4][0] = 41/64,
   roadDataFilterCoeff[4][1] = 15/64,
```

-continued

```
        roadDataFilterCoeff[4][2] = 6/64,
        roadDataFilterCoeff[4][3] = 2/64,
        roadDataFilterCoeff[5][0] = 41/64,
        roadDataFilterCoeff[5][1] = 15/64,
        roadDataFilterCoeff[5][2] = 5/64,
        roadDataFilterCoeff[5][3] = 2/64,
        roadDataFilterCoeff[5][4] = 1/64.
        Note: roadDataFilterCoeff[0][X] and
        roadDataFilterCoeff[1][X] are not used.
}
```

roadDataSampleSize

Specifies the number of road data samples to use from roadData[angle].range[sample#]. This number can be changed from the Operator Interface Control object.

Default value=8.

roadDirection

Indicates the last estimated direction the roadway is going.

The possible values are:

LEFT_TO_RIGHT: The roadway is curving left to right.

NON_DETERMINED: The road direction is not currently determined.

RIGHT_TO_LEFT: The roadway is curving right to left.

STRAIGHT: The roadway is going straight.

roadEdgeAngleBinsMin

Specifies the minimum number of valid angle bins necessary to define the road edge. This number can be changed from the Operator Interface Control object.

Default value=2.

roadEdgeDetWindowSize[ ]

Specifies the range bin window size for estimating the range to the road edge. The value is dependent on the FCW vehicle velocity. These numbers can be changed from the Operator Interface Control object. See Table F for default values.

TABLE F roadEdgeDetWindowSize[ ] Default Values

| RoadEdgeDetWindowSize | Number of Range Bins | Vehicle Velocity |
|---|---|---|
| [0] | 9 | <10 meters/second (22.3 MPH) |
| [1] | 18 | >=10 & <20 meters/second (44.7 MPH) |
| [2] | 36 | >=20 meters/second (44.7 MPH) |

rotate45Factor

Specifies the multiplication factor to be used for adjusting the vehToRoadEdgeDist in the X-axis and Y-axis directions when a 45 degree angle between roadData[angle] and vehPath[angle] data points is used. This number can be changed from the Operator Interface Control object.

Default value=0.707.

slope45degThreshMin

Specifies the minimum required roadData[angle] slope before a 45 degree angle is used for the distance between the roadData[angle] and vehpath[angle] data points. This number can be changed from the Operator Interface Control object.

Default value=0.25.

trackedObjectPosTolerance

Specifies the position tolerance to put around a tracked object when updating road data. This parameter can be changed from the Operator Interface Control object.

```
{
xMax: X axis position tolerance when checking against the maximum allowable X position.
xMin: X axis position tolerance when checking against the minimum allowable X position.
yLeft: Y axis position tolerance when checking against the left most Y position.
yRight: Y axis position tolerance when checking against the right most Y position.
}
```

validRoadPosUncertainty[ ]

Specifies the number of range bins of uncertainty of valid new road data versus vehicle velocity. This number can be changed from the Operator Interface Control object.

See Table C for the default values of this data item.

vehDirection

Indicates the last estimated direction the vehicle is going:

The possible values are:

LEFT_TO_RIGHT: The path of the FCW vehicle is estimated to be going from left to right.

NON_DETERMINED: The path of the FCW vehicle is not currently determined.

RIGHT_TO_LEFT: The path of the FCW vehicle is estimated to be going from the right to the left.

STRAIGHT_ON_LEFT_EDGE: The path of the FCW vehicle is estimated to be straight on the left edge of the road.

STRAIGHT_ON_RIGHT_EDGE: The path of the FCW vehicle is estimated to be straight on the right edge of the road.

vehPath[angle]

Indicates the predicted path of the host vehicle 102.

```
{
dist: Distance from the host vehicle to this point when following the predicted path of the host vehicle.
xPos: X axis position of the predicted host vehicle path for a given angle,
yPos: Y axis position of the predicted host vehicle path for a given angle.
}
```

vehToRoadEdgeDist

Identifies the last used value of distance between the center of the vehicle and the road edge.

vehToRoadEdgeDistMin

Specifies the center of the vehicle in the Y axis direction to the road edge distance that is to be used as a minimum in predicting the vehicle path. This number can be changed from the Operator Interface Control object. Default value=3 meters.

E. Threat Assessment Heuristics

Figure 13:
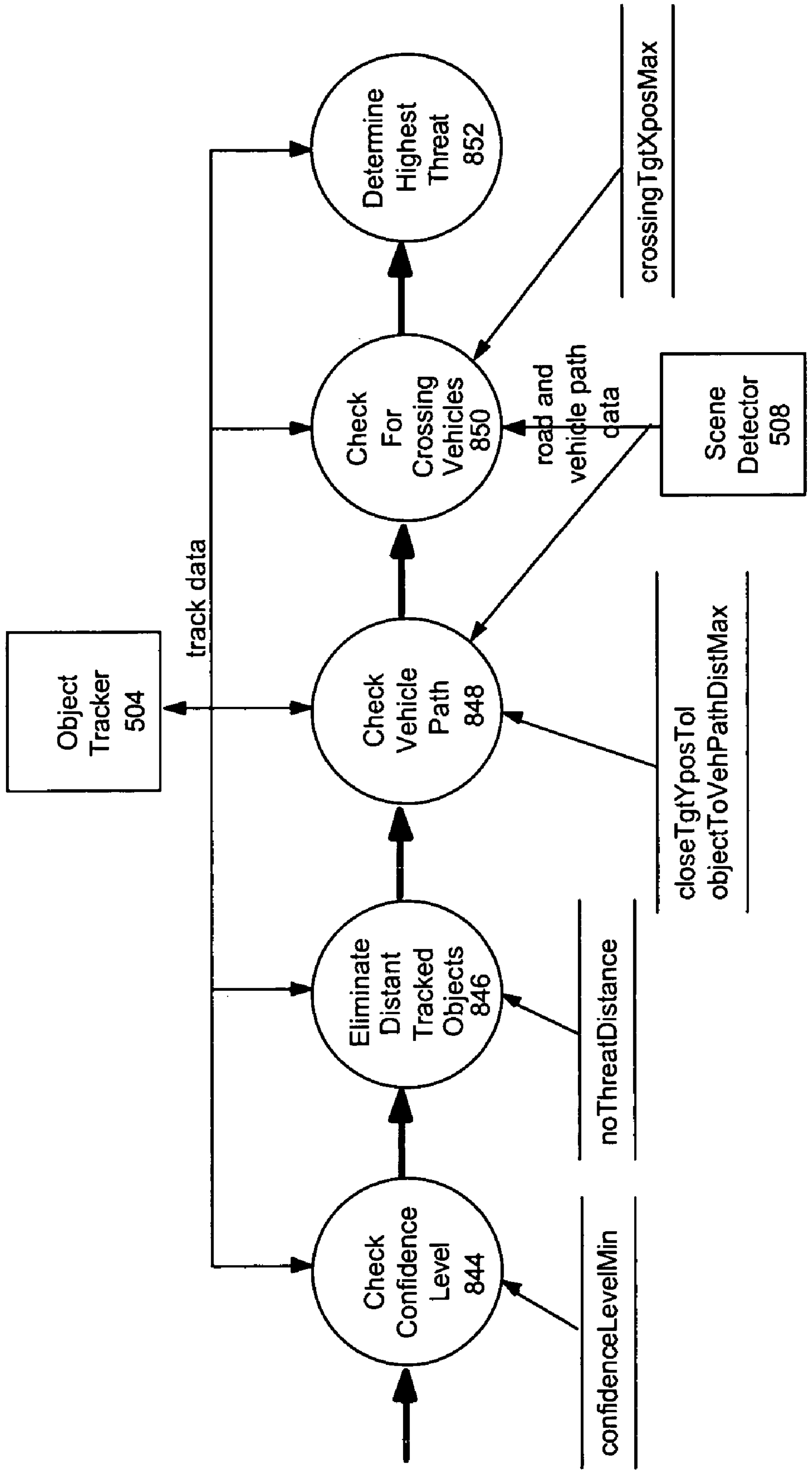
FIG. 13 is a data flow diagram illustrating one example of a threat assessment heuristic that can be incorporated into the invention.

FIG. 13 is a data flow diagram illustrating an example of a threat assessment heuristic. At 844, the system 100 checks to see if the tracked object confident level is large enough that the tracked object constitutes a possible threat. Distant tracked objects can be removed at 846 so that the system 100 can focus on the closest, and thus most likely, threats. At 848, the system 100 can check the path of the host vehicle so that at 850, a check for crossing vehicles can be made. At 852, the system determines which threat is the greatest potential threat. This does not mean that the feedback subsystem 600 will invoke a response based on such a threat. The greatest possible threat at any particular time will generally not merit a response by the feedback subsystem 600.

Some examples of functions and data items that can be used in the process flow are as follows:

CheckConfidenceLevel( )

Checks if tracked object confidence level is large enough to qualify as a possible threat.

```
{
  Perform the following for all tracked objects:
  {
    if (ObjectTracker.trackData[ ].confidenceLevel <
    confidenceLevelMin)
      ObjectTracker.trackData[ ].threatStatus = NO_THREAT;
    else
      ObjectTracker.trackData[ ].threatStatus =
      POSSIBLE_THREAT;
  }
}
```

CheckForCrossingVehicles( )

Checks if tracked objects that are possible threats are crossing vehicles that will not be on the predicted vehicle path when the FCW vehicle arrives.

```
{
Perform the following for all tracked objects with
ObjectTracker.trackData[ ].threatStatus = POSSIBLE_THREAT and
ObjectTracker.trackData[ ].movingClass = OVERTAKING and
ObjectTracker.trackData[ ].xCenter <=
crossingTgtXposMax:
{
Calculate the vehicle time to a possible collision with the tracked object
assuming the velocities stay the same and the tracked object stays on
the predicted vehicle path based on the following:
{
collisionTime
      = ObjectTracker.trackData[      ].distVehPath/
ObjectTracker.trackData[ ].vel;
}
Calculate the predicted position of the tracked object after the amount of
time stored in collisionTime assuming it moves in the same direction
it has been:
{
xPosPredicted = ObjectTracker.trackData[ ].xCenterFiltered[0]
      + ObjectTracker.trackData[ ].xVel[0]*
collisionTime;
yPosPredicted = ObjectTracker.trackData[ ].yCenterFiltered[0]
      + ObjectTracker.trackData[ ].yVel[0]*
collisionTime;
}
Perform the same process used in the function CheckVehiclePath to
determine if xPosPredicted and yPosPredicted indicate the vehicle will still
be on the vehicle path;
if (xPosPredicted and yPosPredicted are not on the vehicle path as
determined above)
ObjectTracker.trackData[ ].threatStatus = NO_THREAT;
}
}
```

CheckVehiclePath( )

Checks if tracked object is on predicted vehicle path.

```
{
if (SceneDetector.vehDirection = NON_DETERMINED)
ObjectTracker.trackData[ ].threatStatus = NO_THREAT;
Perform the following for all tracked objects with
ObjectTracker.trackData[ ].threatStatus = POSSILE_THREAT:
{
firstGreaterXposAngle = the first angle starting with
SceneDetector.firstVehiclePathAngle and checking each successively
greater angle index until
        ObjectTracker.trackData[ ].xCenter >
SceneDetector.vehPath[angle].xPos;
if (firstGreaterXposAngle is found)
{
objectToVehPathDist = the smallest of the distance between the center of
the tracked object (ObjectTracker.trackData[ ].xCenter & .yCenter) and
the following vehicle path points:
        SceneDetector.vehPath [firstGreaterXposAngle-1].xPos
        & .yPos,
        SceneDetector.vehPath [firstGreaterXposAngle].xPos & .yPos,
        SceneDetector.vehPath [firstGreaterXposAngle+1].xPos
        & .yPos;
/* Note: dist = |(largest of xDist & yDist| + 3/8 * |(smallest of xDist &
yDist)|
can be used as an approximation for better execution time. */
objectsNearestVehPathAngle = angle corresponding to
objectToVehPathDist found above;
Perform the following based on SceneDetector.vehDirection:
{
Case of SceneDetector.vehDirection = LEFT_TO_RIGHT
        or STRAIGHT_ON_LEFT_EDGE:
{
    if ((objectToVehPathDist > objectToVehPathDistMax)
        OR (ObjectTracker.trackData[ ].yCenter
            <
    SceneDetector.roadData[objectsNearestVehPathAngle].yPos))
    {
      ObjectTracker.trackData[ ].threatStatus = NO_THREAT;
}
else
{
      ObjectTracker.trackData[ ].distVehPath
            =
      SceneDetector.vehPath[objectsNearestVehPathAngle].dist;
    }
}
Case of SceneDetector.vehDirection = RIGHT_TO_LEFT
            or
    STRAIGHT_ON_RIGHT_EDGE:
{
    if ((objectToVehPathDist > objectToVehPathDistMax)
        OR (ObjectTracker.trackData[ ].yCenter
            >
    SceneDetector.roadData[objectsNearestVehPathAngle].yPos))
    {
      ObjectTracker.trackData[ ].threatStatus = NO_THREAT;
    }
    else
    {
      ObjectTracker.trackData[ ].distVehPath
            =
      SceneDetector.vehPath[objectsNearestVehPathAngle].dist;
              }
            }
          }
        }
        else // firstGreaterXposAngle not found (object is closer than any
        vehicle path point).
        {
        if (ObjectTracker.trackData[ ].yCenter is within ±
        closeTgtYposTol)
          ObjectTracker.trackData[ ].distVehPath =
          ObjectTracker.trackData[ ].distStraight;
        else
          ObjectTracker.trackData[ ].threatStatus = NO_THREAT;
      }
    }
}
```

DetermineHighestThreat( )

Determines the highest threat tracked object.

```
        {
        Perform the following for all tracked objects with
              ObjectTracker.trackData[ ].threatStatus =
              POSSIBLE_THREAT:
        {
        Calculate the host vehicle time to a possible collision with the
        tracked object assuming the velocities stay the same and the
        tracked object stays on the predicted vehicle path based
        on the following:
        {
        collisionTime
              = ObjectTracker.trackData[       ].distVehPath /
        ObjectTracker.trackData[ ].vel;
        }
        Set ObjectTracker.trackData[ ].threatStatus =
        HIGHEST_THREAT for the tracked object with the smallest
        collisionTime;
    }
}
```

EliminateDistantTrackedObjects( )

Eliminates tracked objects as a threat possibility that are obviously far enough away.

```
    {
    Perform the following for all tracked objects with
              ObjectTracker.trackData[ ].threatStatus =
              POSSIBLE_THREAT:
    {
    if (ObjectTracker.trackData[ ].distStraight >= noThreatDistance)
          ObjectTracker.trackData[ ].threatStatus = NO_THREAT;
    }
}
```

closeTgtYposTol

Specifies the Y-axis position tolerance for a tracked object to be considered a possible threat if the xCenter of the tracked object is less than any of the vehicle path points. This number can be changed from the Operator Interface Control object.

Default value=3 meters.

confidenceLevelMin

Specifies the minimum ObjectTracker.trackData[ ].confidenceLevel required to consider a tracked object as a possible threat. This number can be changed from the Operator Interface Control object.

Default value=5.

crossingTgtXposMax

Specifies the maximum X-axis position to check if a tracked object is a crossing vehicle. This number can be changed from the Operator Interface Control object.

Default value=100 meters.

noThreatDistance

Specifies the straight-line distance that is considered to be no possible threat for a collision or need for a warning. This number can be changed from the Operator Interface Control object.

Default value=90 meters (approximately 2.5 seconds*80 miles/hour).

objectToVehPathDistMax

Specifies the maximum distance between the center of a tracked object and the vehicle path in order to consider that the tracked object is on the vehicle path. This number can be changed from the Operator Interface Control object.

Default value=7 meters.

F. Collision Detection Heuristics

Figure 14:
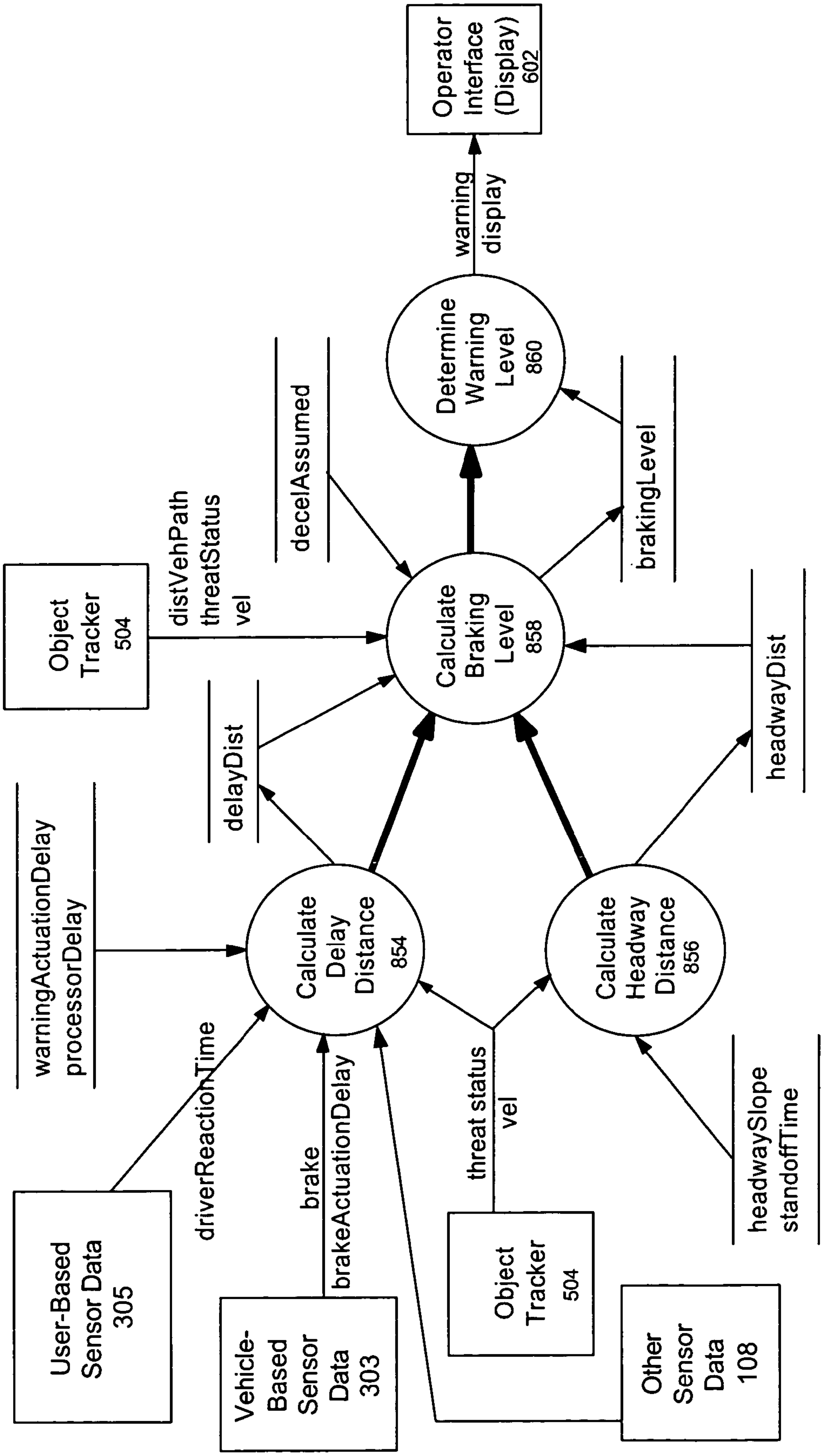
FIG. 14 is a data flow diagram illustrating one example of a threat assessment heuristic that can be incorporated into an automotive embodiment of the invention.

FIG. 14 is a data flow diagram illustrating an example of a collision detection heuristic. At 854, the delay distance is calculated. At 856, the headway distance is calculated. At 858, the breaking level required to avoid collision is calculated. Based on the delay distance at 854, the headway distance at 856, and/or the breaking level at 858, a warning is invoked at 860, or a vehicle-based response is generated by the feedback subsystem 600.

Some examples of functions and data items that can be used in the process flow are as follows:

CalculateBrakingLevel( )

Calculates the required braking level of the host vehicle 102.

```
{
Perform the following for the tracked object with
ObjectTracker.trackData[ ].threatStatus = HIGHEST_THREAT:
{
decelDistAssumed = ObjectTracker.trackData[ ].vel^2/(2.0 *
decelAssumed * g);
brakingDist = delayDist + headwayDist +
ObjectTracker.trackData[ ].distVehPath;
if (brakingDist != 0)
     brakingLevel = -decelDistAssumed / brakingDist;
          else
               brakingLevel = -1.0;
     }
}
```

CalculateDelayDistance( )

Calculates the amount of distance change between the FCW vehicle and highest threat tracked object based on various delays in response.

```
     {
          Perform the following for the tracked object with
          ObjectTracker.trackData[ ].threatStatus = HIGHEST_THREAT:
          {
          if (VehicleInterface.BrakeSensor.brake = OFF)
               delayTime = Driver.driverReactionTime +
               BrakeSensor.brakeActuationDelay
                    + warningActuationDelay +
               processorDelay;
          else
               delayTime = warningActuationDelay + processorDelay;
          delayDist = delayTime * ObjectTracker.trackData[ ].vel;
     }
}
```

CalculateHeadwayDistance( )

Calculates the amount of desired coupled headway distance between the FCW vehicle and highest threat tracked object. Coupled headway is the condition when the driver of the FCW vehicle is following the vehicle directly in front at near zero relative speed and is controlling the speed of the FCW vehicle in response to the actions of the vehicle in front.

```
{
    Perform the following for the tracked object with
    ObjectTracker.trackData[ ].threatStatus = HIGHEST__THREAT:
    {
        headwayTime = headwaySlope *
        ObjectTracker.trackData[ ].vel + standoffTime;
        headwayDist = headwayTime * ObjectTracker.trackData[ ].vel;
    }
}
```

DetermineWarningLevel( )

Determines the warning level to display to the driver based on the calculated braking level required.

{
Determine the warning display based on Table G;

TABLE G

Warning Display vs. Braking Level

| Warning Display | brakingLevel |
|---|---|
| 1st Green Bar | >−0.09 and <=0.0 |
| 2nd Green Bar | >−0.135 and <=−0.09 |
| 3rd Green Bar | >−0.18 and <=−0.135 |
| 1st Amber Bar | >−0.225 and <=−0.18 |
| 2nd Amber Bar | >−0.27 and <=−0.225 |
| 3rd Amber Bar | >−0.315 and <=−0.27 |
| 1st Red Bar | >−0.36 and <=−0.315 |
| 2nd Red Bar | >−0.405 and <=−0.36 |
| 3rd Red Bar | >−0.45 and <=−0.405 |
| Blue Indicator | <=−0.45 |

}
brakingLevel

The calculated braking level of the host vehicle relative to a reasonable assumed braking level that is necessary to avoid a collision.

decelAssumed

Specifies an assumed reasonable deceleration as a multiplier of g (9.8 meters/second$^2$). This number can be changed from the Operator Interface Control object.

Default value=1.

delayDist

The amount of distance change between the FCW vehicle and the highest threat tracked object based on various delays in response.

g

Deceleration level=9.8 meters/second$^2$.

headwayDist

The distance between vehicles necessary to maintain a reasonable buffer under routine driving conditions.

headwaySlope

Specifies the slope of the coupled headway time. This number can be changed from the Operator Interface Control object.

Default value=0.01 second$^2$/meter.

processorDelay

Specifies the update rate of the processing system. It is primarily made up of baseband processing and RADAR data processing times. This number can be changed from the Operator Interface Control object.

Default value=0.11 seconds.

standoffTime

Specifies the constant term of the coupled headway time. This number can be changed from the Operator Interface Control object.

Default value=0.5 seconds.

warningActuationDelay

Specifies the time required for the processor output to become an identifiable stimulus to the driver. This number can be changed from the Operator Interface Control object.

Default value=0.1 seconds.

VIII. Alternative Embodiments

As described above, the invention is not limited for forward-looking radar applications, adaptive cruise control modules, or even automotive applications. The system 100 can be incorporated for use with respect to potentially any vehicle 102. Different situations will call for different heuristics, but the system 100 contemplates improvements in sensor technology, increased empirical data with respect to users, increased computer technology in vehicles, increased data sharing between vehicles, and other advancements that will be incorporated into future heuristics used by the system 100. It is to be understood that the above described embodiments are merely illustrative of one embodiment of the principles of the present invention. Other embodiments can be devised by those skilled in the art without departing from the scope of the invention.

What is claimed is:

1. A sensor system for a vehicle, comprising:

an external sensor subsystem providing for the capture of external sensor data, wherein said external sensor subsystem includes a plurality of sensors providing for the capture of a plurality of sensor data from a plurality of sensor zones;

an internal sensor subsystem providing for the capture of internal sensor data, wherein said internal sensor data includes at least one of a user-based attribute and a vehicle-based attribute;

an information sharing subsystem providing for the exchange of shared sensor data; and an analysis subsystem providing for the generating of a threat assessment from the external sensor data, weighted shared sensor data, and at least one of the user-based attribute and the vehicle-based attribute.

2. The system of claim 1, wherein said plurality of sensors include a plurality of sensor types.

3. The system of claim 2, wherein no sensor in said plurality of sensors is of the same sensor type.

4. The system of claim 1, wherein no two sensors in said plurality of sensors capture sensor data from the same said sensor zone.

5. The system of claim 1, wherein said plurality of sensors in said external sensor subsystem comprise:

a forward sensor component for capturing sensor data in a forward sensor zone;

a side sensor component for capturing sensor data in a side sensor zone; and a rear sensor component for capturing sensor data in a rear sensor zone.

6. The system of claim 5, wherein said forward sensor component includes a long range sensor, a mid-range sensor, and a short-range sensor.

7. The system of claim 5, wherein said side sensor component includes a lane change and merge detection sensor.

8. The system of claim 5, wherein said rear sensor component includes a near object detection sensor and a rear impact collision warning sensor.

9. The system of claim 1, wherein said user-based attribute is a selection-based attribute.

10. The system of claim 1, wherein said user-based attribute is a history-based attribute.

11. The system of claim 1, wherein said user-based attribute is a condition-based attribute.

12. The system of claim 1, wherein said internal sensor data is captured with an identification technology.

13. The system of claim 12, wherein said identification technology is a smart card.

14. The system of claim 1, wherein the information sharing subsystem provides for the receiving of the shared sensor data from a target vehicle.

15. The system of claim 14, wherein said information sharing subsystem provides for the sending of data to the target vehicle.

16. The system of claim 1, wherein the information sharing subsystem provides for the receiving of the shared sensor data from an infrastructure sensor.

17. The system of claim 16, wherein said information sharing subsystem provides for the sending of data to said infrastructure sensor.

18. The system of claim 16, wherein the information sharing subsystem provides for the receiving of shared sensor data from a target vehicle.

19. The system of claim 1, wherein the information sharing subsystem provides for the receiving of the shared sensor data from information sources or systems external to the vehicle.

20. The system of claim 19, wherein the information sources or systems include a cell network.

21. The system of claim 19, wherein the information sources or systems include an internet connection.

22. The system of claim 19, wherein the information sources or systems include a dedicated short range communication transmitter.

23. The system of claim 1, wherein said plurality of sensors are connected by a network.

24. The system of claim 23, wherein said network includes a sensor management object for integrating the sensor data from said plurality of sensors.

25. The system of claim 1, wherein said plurality of sensors includes a global positioning system (GPS) receiver.

26. A sensor system for a vehicle, comprising:

an external sensor subsystem providing for the capture of external sensor data, wherein said external sensor subsystem includes a plurality of sensors providing for the capture of a plurality of sensor data from a plurality of sensor zones;

an internal sensor subsystem providing for the capture of internal sensor data, wherein said internal sensor data includes user-based attributes and vehicle-based attributes;

an information sharing subsystem providing for the exchange of shared sensor data, wherein said shared sensor data includes foreign sensor data and infrastructure sensor data; and an analysis subsystem providing for the generating of a threat assessment from the external sensor data, user-based attributes, vehicle-based attributes, and weighted shared sensor data.

27. A method of configuring a sensor system for an automobile, comprising the steps of:

installing a plurality of sensors capable of capturing a plurality of sensor data from a plurality of sensor zones, wherein at least one sensor is not an external sensor;

identifying potential overlap between the sensor data captured by the plurality of sensors; and creating a weighted sensor data value for each potentially overlapping sensor data.

28. The method of claim 27, further comprising the step of selecting at least one information sharing sensor located external to the automobile.

29. A sensor system for a vehicle, comprising:

an external sensor subsystem providing for the capture of external sensor data, wherein said external sensor subsystem includes a plurality of sensors providing for the capture of a plurality of sensor data from a plurality of sensor zones; and an analysis subsystem providing for the generating of a threat assessment, the generating of the threat assessment including identifying potential overlap between the sensor data captured by the plurality of sensors and creating a weighted sensor data value for each potentially overlapping sensor data.

30. The system of claim 29, wherein said plurality of sensors include a plurality of sensor types.

31. The system of claim 29, wherein said plurality of sensors in said external sensor subsystem comprise:

a forward sensor component for capturing sensor data in a forward sensor zone;

a side sensor component for capturing sensor data in a side sensor zone; and a rear sensor component for capturing sensor data in a rear sensor zone.

32. The system of claim 31, wherein said forward sensor component includes a long range sensor, a mid-range sensor, and a short-range sensor.

33. The system of claim 29, further comprising an internal sensor subsystem providing for the capture of internal sensor data, wherein said threat assessment subsystem integrates said internal sensor data into said threat assessment.

34. The system of claim 33, wherein said internal sensor data includes a vehicles-based attribute.

35. The system of claim 33, wherein said internal sensor data includes a user-based attribute.

36. The system of claim 29, further comprising an information sharing subsystem providing for the receiving of shared sensor data.

37. The system of claim 36, wherein the information sharing subsystem provides for the receiving of shared sensor data from a target vehicle.

38. The system of claim 36, wherein said information sharing subsystem provides for the sending of data to the target vehicle.

39. The system of claim 36, wherein the information sharing subsystem provides for the receiving of shared sensor data from an infrastructure sensor.

40. The system of claim 36, wherein said information sharing subsystem provides for the sending of data to said infrastructure sensor.

41. The system of claim 36, wherein the information sharing subsystem provides for the receiving of shared sensor data from a target vehicle.

42. The system of claim 36, wherein the information sharing subsystem provides for the receiving of shared sensor data from information sources or systems external to the vehicle.

43. The system of claim 29, wherein said plurality of sensors are connected by a network.

44. The system of claim 43, wherein said network includes a sensor management object for integrating the sensor data from said plurality of sensors.

45. The system of claim 43, wherein said sensors are selectably added to said network in a plug and play fashion.

46. The system of claim 29, wherein said sensors are selectibly added to said network in a plug and play fashion.

* * * * *